US008712238B2

(12) United States Patent
Sakamoto

(10) Patent No.: US 8,712,238 B2
(45) Date of Patent: Apr. 29, 2014

(54) OPTICAL SWITCHING DEVICE AND COMMUNICATIONS SYSTEM

(75) Inventor: Takeshi Sakamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 321 days.

(21) Appl. No.: 13/218,069

(22) Filed: Aug. 25, 2011

(65) Prior Publication Data

US 2012/0121255 A1 May 17, 2012

(30) Foreign Application Priority Data

Nov. 12, 2010 (JP) .................. 2010-254282

(51) Int. Cl.
*H04B 10/08* (2011.01)
*H04J 14/04* (2006.01)
*H04J 14/02* (2006.01)
*H04B 10/293* (2013.01)
*H04Q 11/00* (2006.01)

(52) U.S. Cl.
CPC ........ *H04B 10/2939* (2013.01); *H04J 14/0212* (2013.01); *H04J 14/0217* (2013.01); *H04J 14/0221* (2013.01); *H04J 14/0275* (2013.01); *H04Q 11/0005* (2013.01); *H04Q 2011/0015* (2013.01)
USPC ..................... 398/34; 398/48; 398/50; 398/83

(58) Field of Classification Search
CPC ............. H04B 10/2939; H04J 14/0212; H04J 14/0217; H04J 14/0221; H04J 14/0275; H04Q 11/0005; H04Q 2011/0049
USPC .......................................... 398/34, 48, 50, 83
See application file for complete search history.

(56) References Cited

U.S. PATENT DOCUMENTS

| | | | |
|---|---|---|---|
| 6,351,323 B1* | 2/2002 | Onaka et al. ..................... 398/84 |
| 6,542,291 B1* | 4/2003 | Kinoshita et al. ........ 359/341.33 |
| 6,687,049 B1* | 2/2004 | Sulhoff et al. ............. 359/341.4 |
| 6,944,367 B2* | 9/2005 | Kim et al. ........................ 385/24 |
| 7,187,814 B2* | 3/2007 | Noguchi et al. .................. 385/7 |
| 7,268,936 B2* | 9/2007 | Onaka et al. ............ 359/341.41 |
| 2003/0002139 A1* | 1/2003 | Kinoshita et al. ............. 359/337 |
| 2003/0048507 A1* | 3/2003 | Shimomura et al. .......... 359/128 |
| 2004/0131353 A1* | 7/2004 | Cannon et al. ..................... 398/1 |
| 2004/0179846 A1* | 9/2004 | Yue et al. ........................ 398/94 |
| 2009/0154923 A1* | 6/2009 | Kwon et al. .................... 398/48 |
| 2009/0232497 A1* | 9/2009 | Archambault et al. ......... 398/50 |
| 2010/0129082 A1* | 5/2010 | Zhong et al. .................... 398/83 |
| 2010/0272441 A1* | 10/2010 | Boduch et al. .................. 398/83 |

FOREIGN PATENT DOCUMENTS

| | | |
|---|---|---|
| JP | 11-289296 | 10/1999 |
| JP | 2004-112811 A | 4/2004 |
| JP | 2004-228404 A | 8/2004 |
| JP | 2005-348270 A | 12/2005 |
| JP | 2009-145869 A | 7/2009 |
| JP | 2009-206707 A | 9/2009 |
| JP | 2010-056676 A | 3/2010 |
| WO | WO 99/40695 | 8/1999 |

* cited by examiner

*Primary Examiner* — Ken Vanderpuye
*Assistant Examiner* — Abbas H Alagheband
(74) *Attorney, Agent, or Firm* — Fujitsu Patent Center

(57) ABSTRACT

An optical switching device includes a optical add/drop multiplexer that at least adds an optical signal into and/or drops an optical signal from wavelength division multiplexed light that is wavelength division multiplexed optical signals; a plurality of amplifiers that are disposed on optical paths included in the optical add/drop multiplexer and that can use supplied pump light to amplify the optical signals; an optical source that generates the pump light; and an optical switch that supplies the generated pump light to any one of the amplifiers.

16 Claims, 21 Drawing Sheets

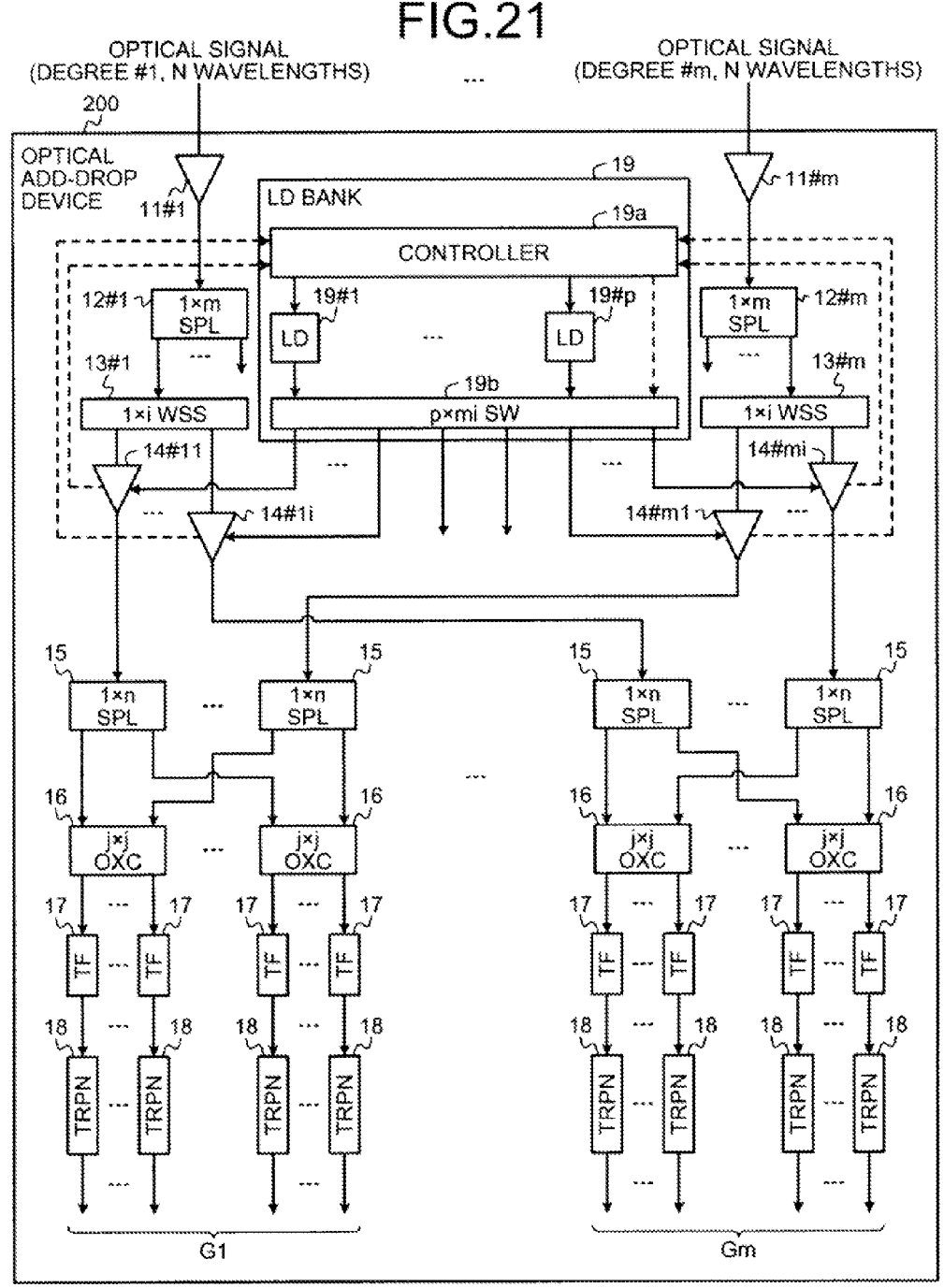

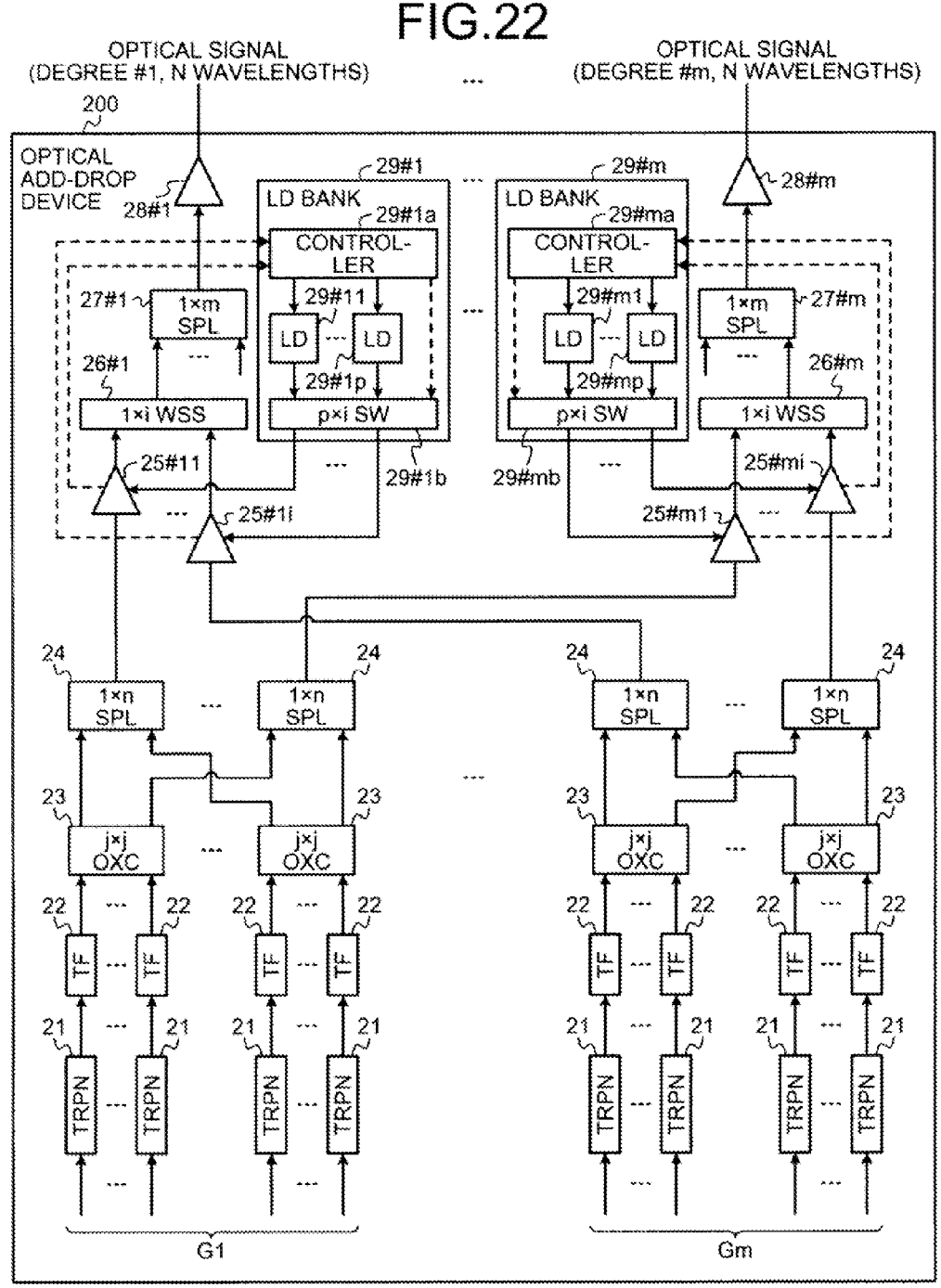

OPTICAL SWITCHING DEVICE AND COMMUNICATIONS SYSTEM

CROSS REFERENCE TO RELATED APPLICATIONS

This application is based upon and claims the benefit of priority of the prior Japanese Patent Application No. 2010-254282, filed on Nov. 12, 2010, the entire contents of which are incorporated herein by reference.

FIELD

The embodiments discussed herein are related to an optical switching device and communications system.

BACKGROUND

Conventionally, in optical communication, wavelength division multiplex (WDM) networks that transmit WDM optical signals are used (see, for example, Japanese Laid-Open Patent Publication No. 2010-056676). In WDM networks, optical add-drop devices such as optical add-drop multiplexers (OADM) and reconfigurable-OADMs (R-OADM) that add and/or drop optical signals according to wavelength are used.

Functions for efficiently and flexibly building, modifying, and managing WDM networks is demanded of optical add-drop devices. For example, functions enabling wavelength dependency (colored), direction dependency (directional), and collision of identical wavelengths (contention) among nodes to be avoided is demanded of optical add-drop devices. Such functions are called colorless, directionless, contentionless (CDC) functions.

Colorless describes a function of being able to input an arbitrary wavelength into an arbitrary port of an optical add-drop device and to output an arbitrary wavelength from an arbitrary output. Directionless describes a function of being able to guide optical signals from terminals to an arbitrary degree and to guide optical signals from the degrees to an arbitrary terminal, in a configuration in which the optical add-drop device has multiple degrees. Contentionless describes a function of being able to avoid collisions of optical signals of the same wavelength in the optical add-drop device.

However, the conventional technology above has a problem in that optical signal amplification cannot be efficiently performed. In particular, in a configuration realizing CDC function, since optical elements are numerous, an amplifier is used along the path to compensate optical signal loss. Further, in the configuration realizing CDC function, since optical elements of multiple ports are connected, the number of times an optical signal is dropped and the number of input paths, as well as the number of amplifiers for compensating optical element loss, become numerous.

In particular, among paths that drop channels, optical signals may concentrate at a particular path. Moreover, since the path where the optical signals concentrate is flexibly changed according to application, the path where the optical signals concentrate cannot be preliminarily designated. Consequently, if each of the amplifiers is given the functional capacity to sufficiently perform amplification when optical signals concentrate, amplifier cost becomes high. Further, in an amplifier of a path where optical signals do not concentrate, the capability of the amplifier is not fully utilized, making the utilization rate of the amplifier low.

SUMMARY

According to an aspect of an embodiment, an optical switching device includes a optical add/drop multiplexer that at least adds an optical signal into and/or drops an optical signal from wavelength division multiplexed light that is wavelength division multiplexed optical signals; a plurality of amplifiers that are disposed on optical paths included in the optical add/drop multiplexer and that can use supplied pump light to amplify the optical signals; an optical source that generates the pump light; and an optical switch that supplies the generated pump light to any one of the amplifiers.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 21 is a diagram of a second example of the optical add-drop device.

FIG. 22 is a diagram of a third example of the optical add-drop device.

DESCRIPTION OF EMBODIMENTS

Preferred embodiments of the present invention will be explained with reference to the accompanying drawings.

Figure 1:
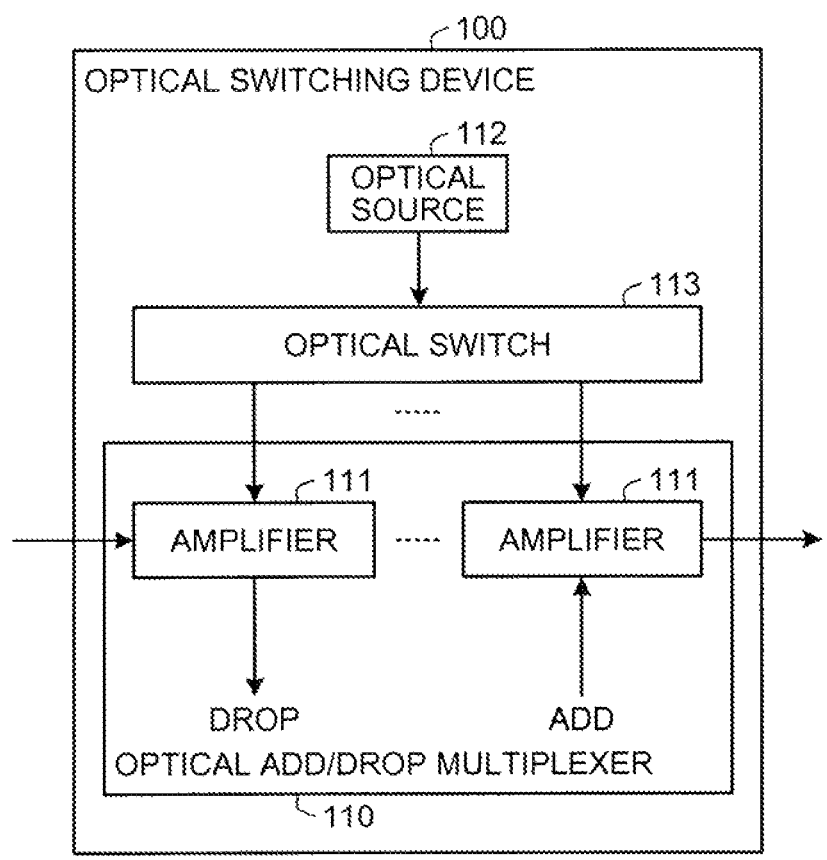
FIG. 1 is a diagram depicting an optical switching device according to an embodiment.

FIG. 1 is a diagram depicting an optical switching device according to an embodiment. As depicted in FIG. 1, an optical switching device 100 includes a switching unit 110, multiple amplifiers 111, an optical source 112, and an optical switch 113. Wavelength division multiplexed light obtained by wavelength division multiplexing multiple optical signals, is input to the switching unit 110. The switching unit 110, for example, is an adding unit that adds an optical signal to the input wavelength division multiplexed light. For example, the switching unit 110 adds an optical signal of a given wavelength to the input wavelength division multiplexed light and outputs the resulting light downstream.

Further, the switching unit 110 may be a dropping unit that drops an optical signal from the input wavelength division multiplexed light. For example, the switching unit 110 drops an optical signal of given wavelength among the optical signals of various wavelengths included in the input wavelength division multiplexed light, and outputs the optical signals of other wavelengths downstream (through). Alternatively, the switching unit 110 may be an add-drop unit that both adds and drops optical signals with respect to the input wavelength division multiplexed light. In this case, the optical switching device 100 functions as an OADM.

The amplifiers 111 are disposed in the optical paths of the switching unit 110 and amplify optical signals passing through the optical path. Further, each of the amplifiers 111 has an input port to which pump light is supplied from a source external to the amplifier 111. Each of the amplifiers 111 can use the pump light input to the input port to further amplify the optical signal. For example, the amplifiers 111 may be amplifiers that compensate optical loss in the transmission path, upstream or downstream from the switching unit 110. The amplifiers 111 may be amplifiers that compensate optical loss in the add/drop route of the switching unit 110.

The optical source 112 generates pump light to be supplied to the amplifiers 111. The optical source 112 outputs the generated pump light to the optical switch 113. The optical source 112, for example, is a laser diode (LD). The optical switch 113 supplies the pump light output from the optical source 112 to any one of the amplifiers 111. For example, the optical switch 113 is an optical cross-connect that connects the optical source 112 and the amplifiers 111.

Thus, among the amplifiers 111, an amplifier 111 having insufficient amplification capacity is supplied pump light from the optical source 112 via the optical switch 113, enabling the insufficiency to be compensated. Therefore, consequent to the add or drop state of the optical signals at the switching unit 110, the number of wavelengths of the optical signals respectively input to the amplifiers is biased and even if the capacity of one of the amplifiers 111 is insufficient, the insufficiency can be compensated.

Further, the optical source 112 may be disposed in plural. In this case, the pump light output from each of the optical sources 112 is supplied to any of the amplifiers 111 via the optical switch 113. Consequently, even if more than one of the amplifiers 111 has insufficient capacity, pump light from the optical sources 112 can be supplied to compensate the insufficient capacity of the amplifiers 111. The number of the optical sources 112 is, for example, less than the number of the amplifiers 111.

In this manner, pump light from the optical source 112 is supplied via the optical switch 113 to the amplifier(s) 111 whose capacity is insufficient. Consequently, even if the amplifiers 111 do not respectively have the maximal capacity that may be demanded thereof, insufficiencies in capacity can be compensated by the pump light from the optical source 112. Therefore, amplifiers having capabilities below the maximal level that may be demanded can be used for the amplifiers 111.

Further, by switching (via the optical switch 113) the supply of the pump light that is from the optical sources 112 to an amplifier 111 whose capacity is insufficient, even if the number of the optical sources 112 is less than that of the amplifiers 111, insufficiencies in capacity can be compensated. Therefore, for example, compared to a configuration in which each of the amplifiers 111 have the maximal capacity that may be demanded, optical signal amplification can be efficiently performed.

Figure 2:
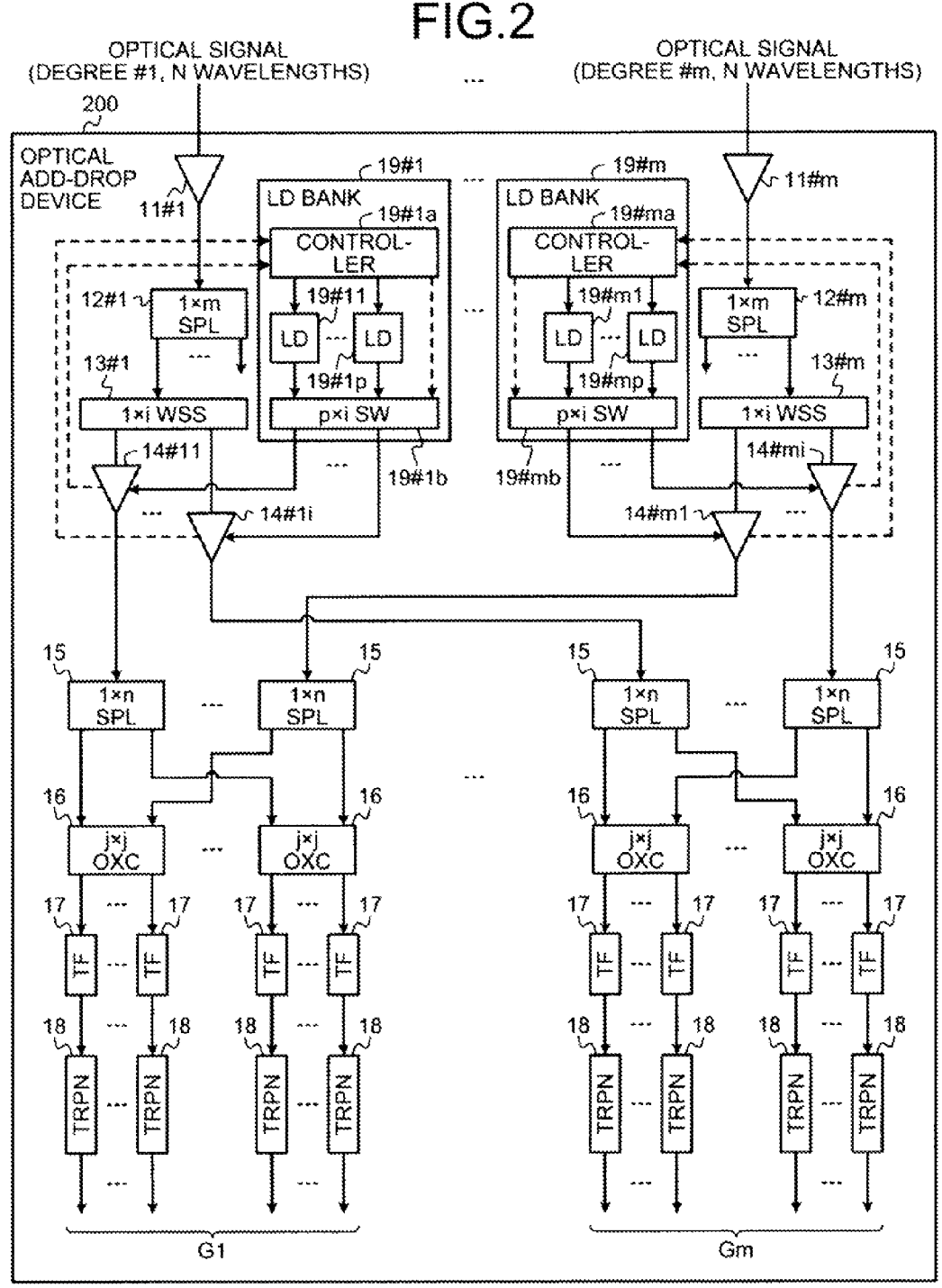
FIG. 2 is a diagram depicting a first example of an optical add-drop device.

FIG. 2 is a diagram depicting a first example of the optical add-drop device. An optical add-drop device 200 FIG. 2 is an example of the optical switching device 100 depicted in FIG. 1. The optical add-drop device 200 is an OADM that adds and drops optical signals with respect to wavelength division multiplexed light. However, in FIG. 2, a configuration of the dropping of an optical signal in the optical add-drop device 200 is depicted.

In FIG. 2, dotted lines represent control signals. Optical signals (wavelength division multiplexed light) are assumed to be input to the optical add-drop device 200 from m degrees (e.g., 8 degrees). Further, each of the optical signals from the degrees to the optical add-drop device 200, is a wavelength division multiplexed optical signal of a maximum of N wavelengths (e.g., 96 wavelengths).

The optical add-drop device 200 includes a dropping unit that has CDC function. For example, the optical add-drop device 200 includes m amplifiers 11#1-11#m, m splitters 12#1-12#m, m wavelength selective switches (WSS) 13#1-13#m, m×i amplifiers 14#11-14#mi, m×i splitters 15, k optical cross connects (OXC) 16, k×j tunable filters (TF) 17, k×j transponders (TRPN) 18, and m LD banks 19#1-19#m.

The amplifiers 11#1-11#m and the amplifiers 14#11-14#mi correspond to the amplifiers 111 depicted in FIG. 1. The splitters 12#1-12#m, the wavelength selective switches 13#1-13#m, the splitters 15, the optical cross connects 16 and the tunable filters 17 correspond to the switching unit 110 (dropping unit) depicted in FIG. 1. The LD banks 19#1-19#m correspond to the optical source 112 and the optical switch 113 depicted in FIG. 1.

The m amplifiers 11#1-11#m amplify optical signals from degrees #1-#m, respectively. The amplifiers 11#1-11#m output the amplified optical signals to the splitters 12#1-12#m, respectively. For example, amplifier 11#1 amplifies an optical signal from degree #1 and outputs the amplified optical signal to splitter 12#1. Amplifier 11#m amplifies an optical signal from degree #m and outputs the amplified optical signal to the splitter 12#m.

The m splitters 12#1-12#m (SPL) are 1×m splitters that respectively split into m optical signals, optical signals output from the amplifiers 11#1-11#m. The splitters 12#1-12#m respectively output one of the resulting m optical signals to the wavelength selective switches 13#1-13#m (drop) and output the remaining m−1 signals to paths of other degrees (through).

For example, splitter 12#1 splits into m optical signals, the optical signal output from the amplifier 11#1 and outputs one of the resulting m optical signals to the wavelength selective switch 13#1. The splitter 12#m splits into m optical signals, the optical signal output from the amplifier 11#m and outputs one of the resulting m optical signal to the wavelength selective switch 13#m.

The m wavelength selective switches 13#1-13#m respectively are 1×i wavelength selective switches that according to wavelength, separate the optical signals output from the splitters 12#1-12#m, into i optical signals. The wavelength selective switches 13#1-13#m output the i optical signals to the amplifiers 14#11-14#1i, . . . , 14#m1-14#mi, respectively. For example, wavelength selective switch 13#1 outputs i optical signals to the amplifiers 14#11-14#1i, respectively. Further, wavelength selective switch 13#m outputs i optical signals to the amplifiers 14#m1-14#mi, respectively.

The m×i amplifiers 14#11-14#1i, . . . , 14#m1-14#mi amplify the optical signals output from the wavelength selective switches 13#1-13#m, respectively. The amplifiers 14#11-14#1i, . . . , 14#m1-14#mi output the amplified optical signals to the m×i splitters 15, respectively.

The amplifiers 14#11-14#1i, . . . , 14#m1-14#mi can further amplify the optical signals, respectively, by using the pump light supplied from the LD banks 19#1-19#m. For example, the amplifiers 14#11-14#1i, using the pump light supplied from LD bank 19#1, can amplify the optical signal. Further, if the amplifiers 14#11-14#1i are respectively supplied pump light from the LD bank 19#1, a control signal for controlling the power of the pump light is output to the LD bank 19#1.

The amplifiers 14#m1-14#mi, using the pump light supplied from the LD bank 19#m can amplify the optical signals. Further, if the amplifiers 14#m1-14#mi are respectively supplied the pump light from the LD bank 19#m, a control signal for controlling the power of the pump light is output to the LD bank 19#m.

The m×i splitters 15 (SPL) are respectively 1×n splitters that split into n optical signals, the optical signals output from the amplifiers 14#11-14#1i, . . . , 14#m1-14#mi. The m×i splitters 15 output the resulting n optical signals to the k optical cross connects.

The k optical cross connects 16 are respectively j×j optical cross connects that switch the paths of the optical signals that are from the m×i splitters 15. The k optical cross connects 16 output to the k×j tunable filters 17, the optical signals whose paths have been switched.

The k×j tunable filters 17 respectively extract a given wavelength of the optical signals output from the k optical cross connects 16. The given wavelength extracted by the k×j tunable filters 17 can be changed by setting. The k×j tunable filters 17 output the extracted optical signals to the k×j transponders 18, respectively.

The k×j transponders 18 (receiver) receive the optical signals output from the k×j tunable filters 17, respectively. The k×j transponders 18 are separated into groups G1-Gm.

The m LD banks 19#1-19#m, in the present example, are respectively set according to the degrees #1-#m. The LD banks 19#1-19#m respectively include a controller 19#1a-19#ma, a set of LDs 19#11-19#1p, . . . , 19#m1-19#mp, and an optical switch 19#1b-19#mb. The LDs 19#11-19#1p, . . . , 19#m1-19#mp correspond to the optical source 112 depicted in FIG. 1. The optical switches 19#1b-19#mb correspond to the optical switch 113 depicted in FIG. 1.

For example, LD bank 19#1 includes controller 19#1a, LDs 19#11-19#1p, and optical switch 19#1b. The controller 19#1a controls the LDs 19#11-19#1p by outputting drive current to the LDs 19#11-19#1p, respectively. Further, the controller 19#1a, based on the control signal output from the amplifiers 14#11-14#1i, changes the drive current to control the power of the pump light output from the LDs 19#11-19#1p.

The controller 19#1a further controls the optical switch 19#1b and changes the destination to which the pump light output from the LDs 19#11-19#1p is supplied. The control of the LDs 19#11-19#1p and the optical switch 19#1b by the controller 19#1a, for example, is executed according to user operation of the controller 19#1a.

The p LDs 19#11-19#1p respectively generate pump light of a power corresponding to the drive current output from the controller 19#1a and output the pump light to the optical switch 19#1b. "p", for example, is a value less than "m", which is the number of the amplifiers 14#11-14#1i. The optical switch 19#1b (p×i SW) is an optical cross connect that supplies the pump light from each of the LDs 19#11-19#1p to any one of the amplifiers 14#11-14#1i.

Thus, pump light from the LD bank 19#1 can be supplied to an amplifier whose pump light power is insufficient among the amplifiers 14#11-14#1i. In the present example, although description has been given with respect to the LD 19#1, similarly for the LD banks 19#2-19#m, pump light can be supplied to an amplifier whose pump light power is insufficient among the amplifiers 14#21-14#2i, . . . , 14#m1-14#mi.

The number of degrees, the number of wavelengths included in the wavelength division multiplexed light, the application range of the LD banks, the number of LDs, the number of switch ports, the amplifier positions, etc. depicted in FIG. 2 represent one example. Therefore, various changes to the configuration depicted in FIG. 2 are possible. For example, the amplifiers that receive the pump light from the LD banks 19#1-19#m are not limited to the amplifiers 14#11-14#1i, . . . , 14#m1-14#mi. For example, amplifiers disposed on the paths of the switching units that split the optical signals can be applied.

Further, the number of LD banks 19#1-19#m (in the example depicted in FIG. 2, m) and the number of ports of the optical switches 19#1b-19#mb are optimally determined based on the number of amplifiers to be supplied the pump light, the capacity preliminarily determined to be given the amplifiers to be supplied the pump light, etc.

Figure 3:
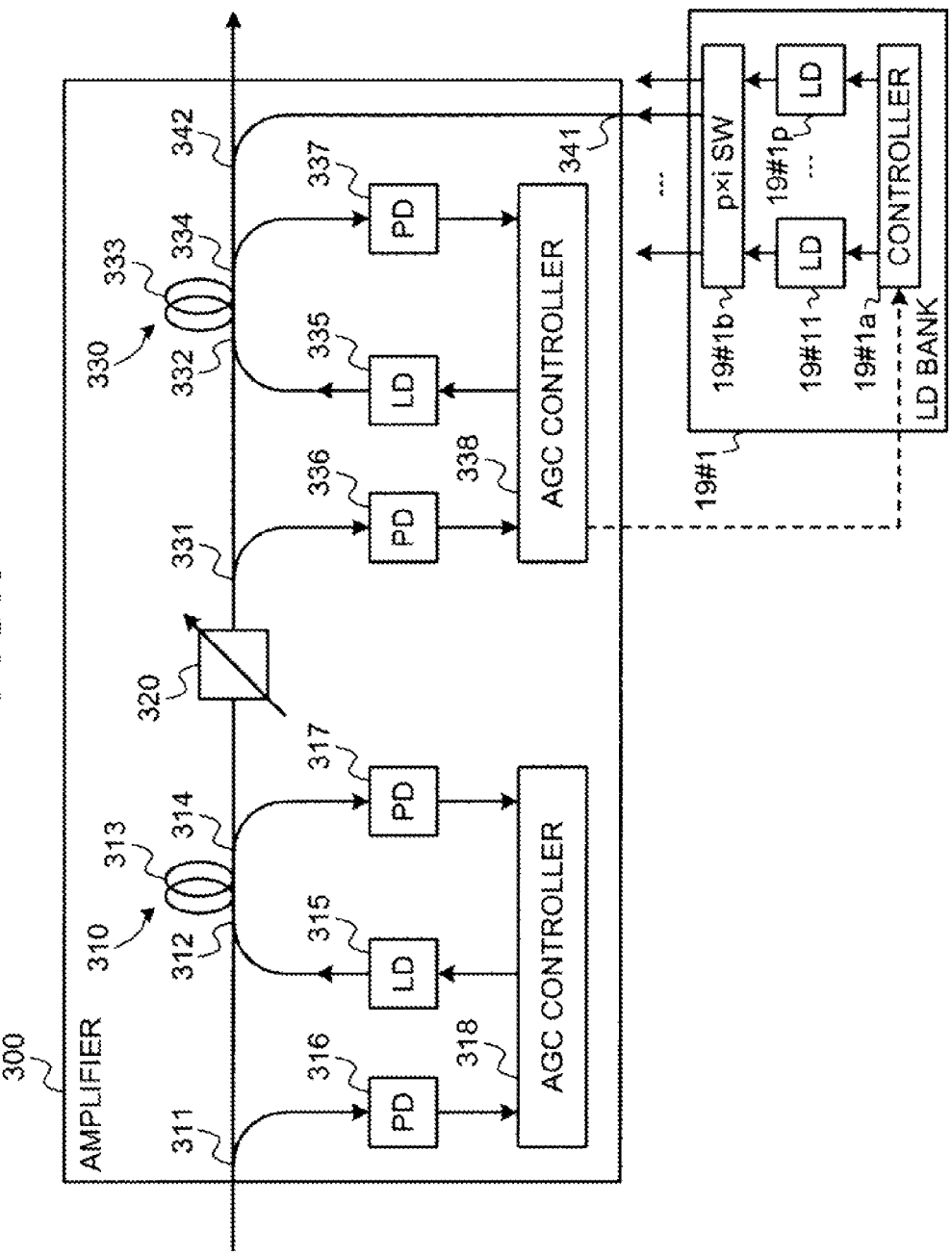
FIG. 3 is a diagram depicting an example of an amplifier.

FIG. 3 is a diagram depicting an example of the amplifier. An amplifier 300 depicted in FIG. 3, for example, can be applied as the amplifiers 14#11-14#1i depicted in FIG. 2. The amplifier 300 amplifies the input optical signal and uses pump light supplied from an external source to be able to further amplify the optical signal. The amplifier 300 includes an amplifying unit 310, a variable attenuator 320, an amplifying unit 330, an input port 341, and a coupler 342.

The amplifying unit 310 includes a splitter 311, a coupler 312, an amplifier medium 313, a splitter 314, an LD 315, a PD 316, a PD 317, and an AGC controller 318. The optical signal input to the amplifier 300, is input to the splitter 311. The splitter 311 splits the input optical signal and respectively outputs the resulting optical signals to the coupler 312 and the PD 316. The coupler 312 couples the optical signal output from the splitter 311 and the pump light output from the LD 315 and outputs the resulting optical signal to the amplifier medium 313.

The amplifier medium 313 amplifies according to input pump light, the optical signal output from the coupler 312. The amplifier medium 313 outputs the amplified optical signal to the splitter 314. The amplifier medium 313, for example, is an erbium-doped optical fiber. The splitter 314 splits the optical signal output from the amplifier medium 313 and outputs the resulting optical signals to the variable attenuator 320 and the PD 317, respectively. The LD 315 generates pump light of a power that is based on a drive signal output from the AGC controller 318 and outputs the generated pump light to the coupler 312.

The PD 316 receives the optical signal output from the splitter 311 and outputs to the AGC controller 318, an electrical signal that is based on the power of the received optical signal. Therefore, the electrical signal output from the PD 316 indicates the power of the optical signal before amplification by the amplifier medium 313. The PD 317 receives the optical signal output from the splitter 314 and outputs to the AGC controller 318, an electrical signal that is based on the power of the received optical signal. Therefore, electrical signal output from the PD 317 indicates the power of the optical signal after amplification by the amplifier medium 313.

The AGC controller 318 outputs a drive signal to the LD 315 and thereby, drives the LD 315. Further, by adjusting the drive signal output to the LD 315, the AGC controller 318 controls the pump light output from the LD 315 and controls the power of the optical signal output from the amplifying unit 310 (auto power control (APC)).

For example, the AGC controller 318 calculates the difference of the power of the electrical signal output from the PD 316 and the power of the electrical signal output from the PD 317. The difference calculated by the AGC controller 318 indicates optical signal gain by the amplifying unit 310. The AGC controller 318 adjusts the drive signal to the LD 315 such that the calculated difference (gain) becomes a given value. Consequently, optical signal gain by the amplifying unit 310 can be held constant.

The variable attenuator 320 is a variable optical attenuator that varies the magnitude of attenuation of the optical signal output from the amplifying unit 310. The variable attenuator 320 outputs the attenuated optical signal to the amplifying unit 330.

The amplifying unit 330 includes a splitter 331, a coupler 332, an amplifier medium 333, a splitter 334, an LD 335, a PD 336, a PD 337, and an AGC controller 338. The splitters 331, 334, the coupler 332, the amplifier medium 333, the LD 335, the PDs 336, 337 and the AGC controller 338, respectively, are of the same configuration as the splitters 311, 314, the coupler 312, the amplifier medium 313, the LD 315, the PDs 316, 317, and the AGC controller 318. However, the optical signal output from the variable attenuator 320 is input to the splitter 331. Further, the splitter 334 outputs the split optical signals to the coupler 342 and the PD 337, respectively.

The input port 341 is a port to which pump light from an external source is input. Further, the input port 341 of the amplifier 300 applied as the amplifiers 14#11-14#1i is connected to one of the output ports of the optical switch 19#1b of the LD bank 19#1, whereby the pump light from the LD bank 19#1 is input to the input port 341. The input port 341 outputs the input pump light to the coupler 342.

The coupler 342 outputs to the amplifier 300 downstream, the optical signal output from the splitter 334 and outputs to the splitter 334, the pump light output from the input port 341, whereby the pump light input from the input port 341 is input to the amplifier medium 333, in a direction opposite to that of the optical signal. Therefore, the optical signal that passes through the amplifier medium 333 is amplified by the pump light from the LD 335 and the pump light supplied from the LD bank 19#1.

Thus, even if the power of the pump light from the LD 335 is insufficient in the AGC by the AGC controller 338, the insufficiency can be compensated by the pump light from the LD bank 19#1. For example, if the amplifier 300 receives supply of the pump light from the LD bank 19#1, the AGC controller 338 adjusts the power of the pump light from the LD 335 and adjusts the power of the pump light from the LD bank 19#1 to perform APC.

For example, to adjust the power of the pump light from the LD 335, the AGC controller 338 outputs to the LD bank 19#1, a control signal indicating to increase, decrease, or maintain the power of the pump light from the LD 335. In response, the controller 19#1a of the LD 19#1 changes the drive current to the LD that is supplying the pump light to the amplifier 300, among the LDs 19#11-19#1p, whereby the power of the pump light supplied from the LD bank 19#1 to the amplifier 300 can be adjusted.

The amplifier 300 depicted in FIG. 3 is one example of the amplifiers 14#11-14#1i and configuration of the amplifiers 14#11-14#1i is not limited hereto. For example, a configuration in which at least one among the amplifying unit 310 and the variable attenuator 320 of the amplifier 300 is omitted may be applied to the amplifiers 14#11-14#1i.

Although description has been given, in which the amplifier 300 is applied as the amplifiers 14#11-14#1i, the amplifier 300 may also be applied as the amplifiers 14#21-14#2i, . . . , 14#m1-14#mi. Consequently, in the amplifiers 14#21-14#2i, . . . , 14#m1-14#mi, even if the power of an internal LD is insufficient, the insufficiency can be compensated by the pump light from the LD banks 19#2-19#m.

Figure 4:
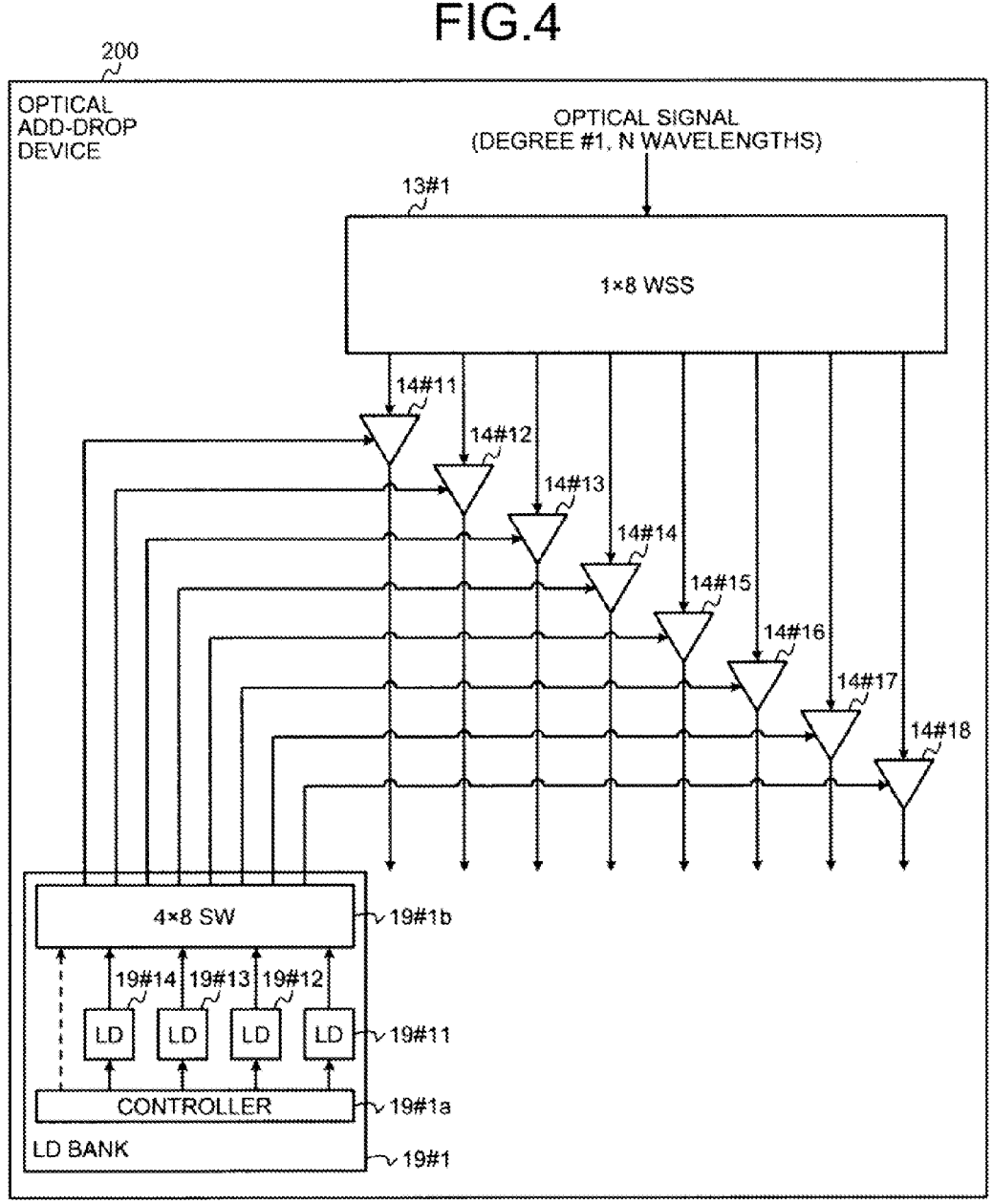
FIG. 4 is a diagram of a portion of the configuration of the optical add-drop device.

FIG. 4 is a diagram of a portion of the configuration of the optical add-drop device. In FIG. 4, an example is described for the wavelength selective switch 13#1 of the degree #1, the amplifiers 14#11-14#1i and the LD bank 19#1, where the degrees (m) is 8 degrees. The wavelength selective switch 13#1 is assumed to be a 1×8 switch. Further, the amplifiers 14#11-14#1i are assumed to be 8 amplifiers, including amplifiers 14#11-14#18.

The LDs 19#11-19#1p of the LD bank 19#1 are assumed to be 4 LDs, including LDs 19#11-19#14 (p=4). In this case, the optical switch 19#1b of the LD bank 19#1 is a 4×8 switch, whereby even if the power of the pump light of the internal LD of a maximum of 4 amplifiers among the amplifiers 14#11-14#18 is insufficient, the insufficiency can be compensated by the pump light from the LDs 19#11-19#14 of the LD bank 19#1 (see, for example, FIGS. 5 to 7).

Figure 5:
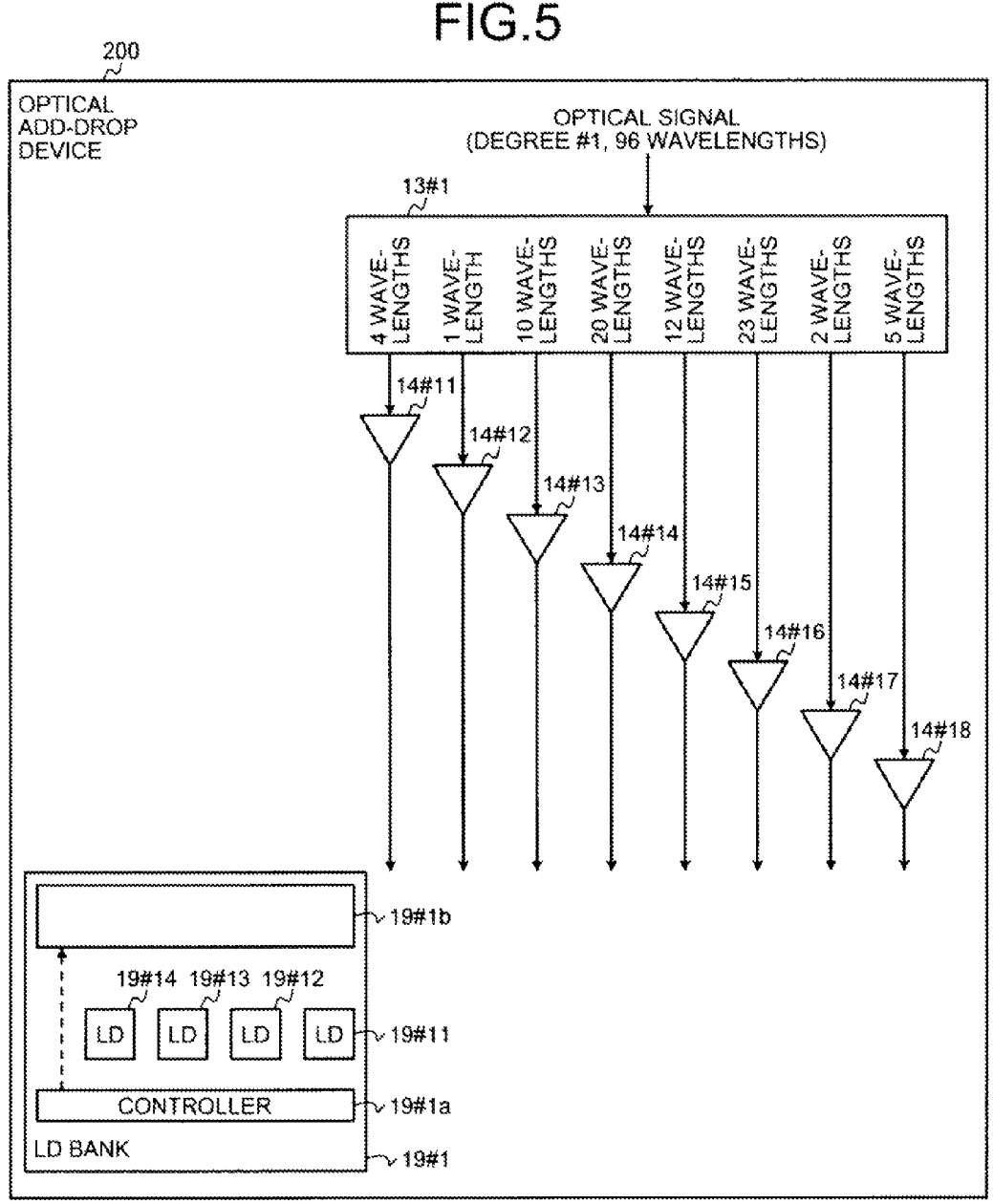
FIG. 5 is a diagram of a first operation example of the configuration depicted in FIG. 4.

FIG. 5 is a diagram of a first operation example of the configuration depicted in FIG. 4. In FIG. 5, components identical to those depicted in FIG. 4 are given the same reference numerals used in FIG. 4 and description thereof is omitted. The optical signal input to the wavelength selective switch 13#1 is assumed to have a maximum of 96 wavelengths (N=96). Further, the amplifiers 14#11-14#1i are each assumed to be able to amplify optical signals of up to 23 wavelengths (similarly, for FIGS. 6 and 7).

As depicted in FIG. 5, the optical signals output from the wavelength selective switch 13#1 to the amplifiers 14#11-14#18 are assumed to respectively include 4, 1, 10, 20, 12, 23, 2, and 5 wavelengths. In this case, at each of the amplifiers 14#11-14#18, since the number of wavelengths in each of the input optical signals is equal to or below the upper limit of 23, supply of the pump light from the LD 19#1 is not necessary. Consequently, the controller 19#1a of the LD bank 19#1 does not output drive current to any of the LDs 19#11-19#14.

Figure 6:
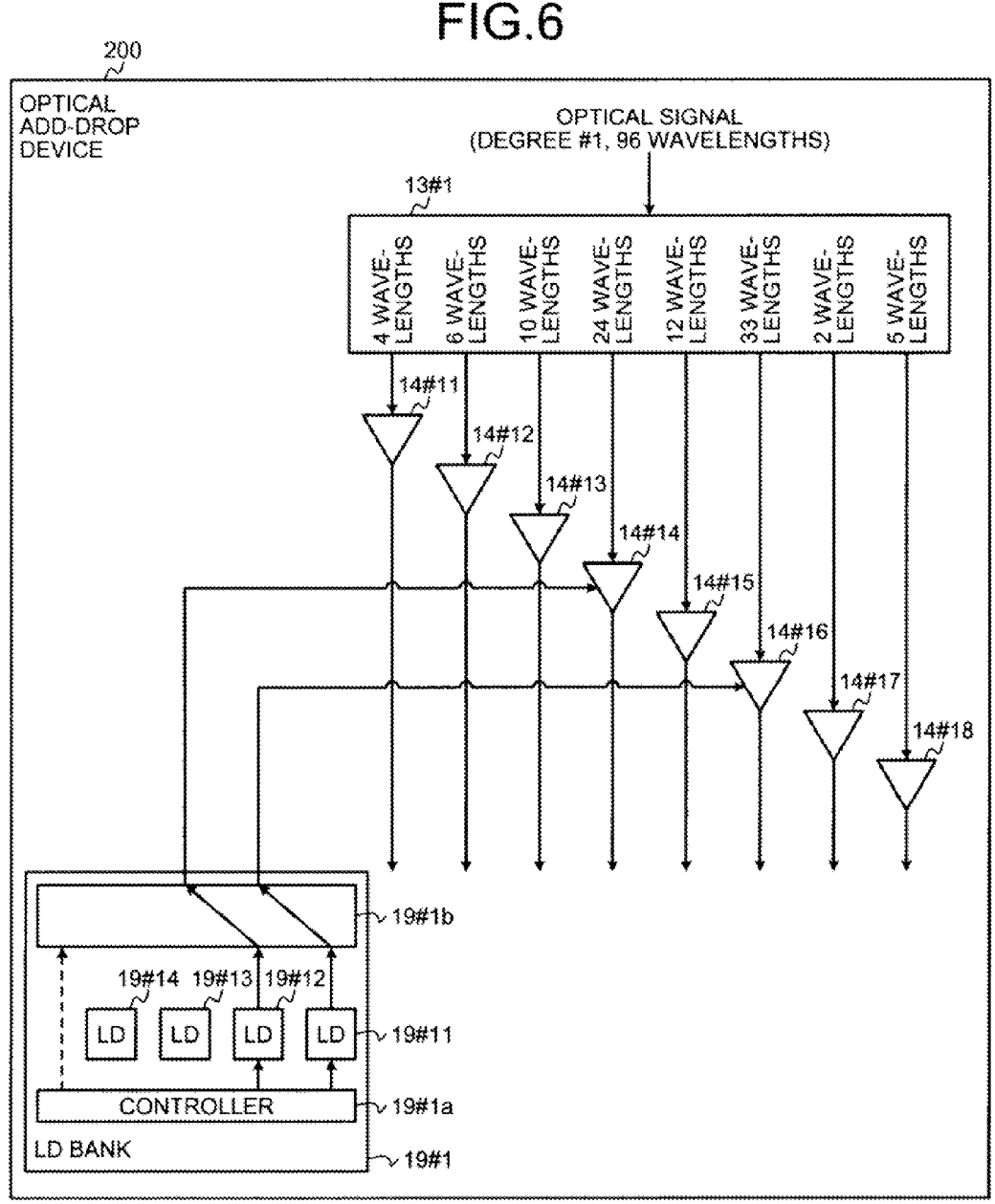
FIG. 6 is a diagram of a second operation example of the configuration depicted in FIG. 4.

FIG. 6 is a diagram of a second operation example of the configuration depicted in FIG. 4. In FIG. 6, components identical to those depicted in FIG. 5 are given the same reference numerals and description thereof is omitted. As depicted in FIG. 6, the optical signals output from the wavelength selective switch 13#1 to the amplifiers 14#11-14#18 are assumed to respectively include 4, 6, 10, 24, 12, 33, 2, and 5 wavelengths. In this case, at each of the amplifiers 14#14, 14#16, the number of wavelengths of the input optical signal exceeds the upper limit of 23 wavelengths.

Consequently, the pump light from the LD bank 19#1 is supplied to the amplifiers 14#14, 14#16. For example, the controller 19#1a of the LD bank 19#1 outputs drive current to the LDs 19#11, 19#12, whereby from each of the LDs 19#11, 19#12, pump light is output to the optical switch 19#1b. Further, the controller 19#1a controls the optical switch 19#1b to connect the LD 19#11 to the amplifier 14#16 and to connect the LD 19#12 to the amplifier 14#14.

The optical switch 19#1b outputs to amplifier 14#16, the pump light output from the LD19#11. Further, the optical switch 19#1b outputs to the amplifier 14#14, the pump light output from the LD 19#12. Consequently, the amplifiers 14#14, 14#16 can respectively use the pump light from the LD bank 19#1 to amplify optical signals having a number of wavelengths that exceeds the upper limit of 23 wavelengths.

Figure 7:
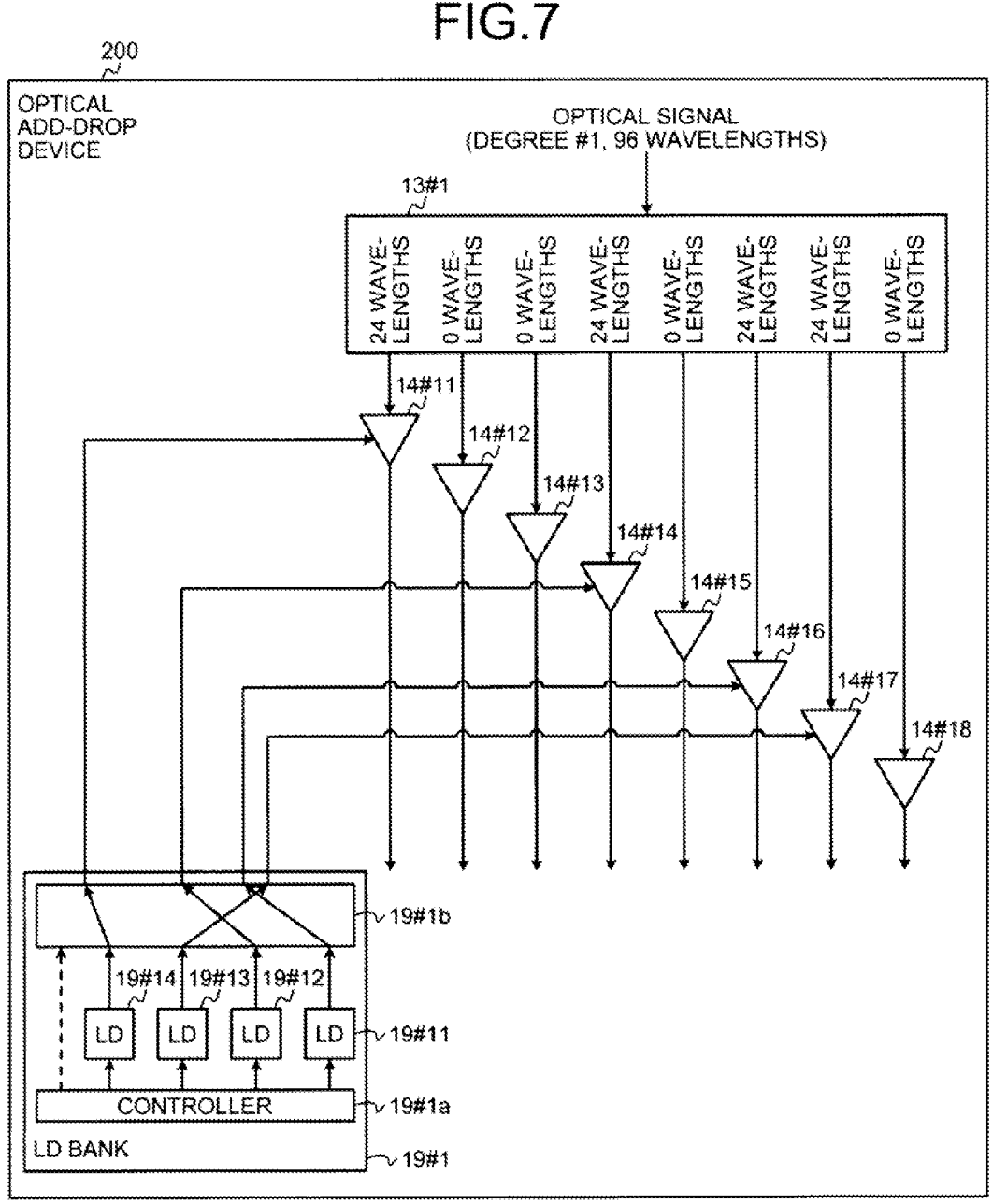
FIG. 7 is a diagram of a third operation of the configuration depicted in FIG. 4.

FIG. 7 is a diagram of a third operation of the configuration depicted in FIG. 4. In FIG. 7, components identical to those depicted in FIG. 6 are given the same reference numerals used in FIG. 6 and description thereof is omitted. As depicted in FIG. 7, the optical signals output from the wavelength selective switch 13#1 to the amplifiers 14#11-14#18 are assumed to respectively include 24, 0, 0, 24, 0, 24, 24, and 0 wavelengths. In this case, at each of the amplifiers 14#11, 14#14, 14#16, and 14#17, the number of wavelengths of the input optical signal exceeds the upper limit of 23 wavelengths.

Consequently, the pump light from the LD bank 19#1 is supplied to the amplifiers 14#11, 14#14, 14#16, and 14#17. For example, the controller 19#1a of the LD bank 19#1 outputs drive current to the LDs 19#11-19#14, whereby from each of the LDs 19#11-19#14, pump light is output to the optical switch 19#1b. Further, the controller 19#1a controls the optical switch 19#1b to connect the LD 19#11 to the amplifier 14#16 and to connect the LD 19#12 to the amplifier 14#14. Further, the controller 19#1a controls the optical switch 19#1b to connect the LD 19#13 to the amplifier 14#17 and to connect the LD 19#14 to the amplifier 14#11.

The optical switch 19#1b outputs to the amplifier 14#16, the pump light output from the LD 19#11 and outputs to the amplifier 14#14, the pump light from the LD 19#12. Further, the optical switch 19#1b outputs to the amplifier 14#17, the pump light from the LD 19#13 and outputs to the amplifier 14#11, the pump light from the LD 19#14. Consequently, the amplifiers 14#11, 14#14, 14#16, and 14#17 can respectively use the pump light from the LD bank 19#1 to amplify optical signals having a number of wavelengths that exceeds the upper limit of 23 wavelengths.

In this manner, even if the amplifiers 14#11-14#18, respectively, can only amplify optical signals of up to 23 wavelengths and the power of the pump light is insufficient, supply of the pump light from the LD bank 19#1 can be received. As a result, for example, compared to a case where the amplifiers 14#11-14#18, respectively, have a capacity enabling amplification of optical signals of up to 96 wavelengths, device cost can be suppressed.

Further, in the examples depicted in FIGS. 4 to 7, among the amplifiers 14#11-14#18, the number of amplifiers that receive input of an optical signal that includes more than the upper limit of 23 wavelengths is at most 4 amplifiers. Therefore, if 4 LDs 19#11-19#14 are disposed in the LD bank 19#1, the insufficiency in amplification capacity of the amplifiers 14#11-14#18 can be compensated.

Thus, compared to a case where an LD (total of 8) is added for each the amplifiers 14#11-14#18, the number of added LDs can be reduced to half. However, for example, in an initial state, 3 or less LDs may be disposed in the LD bank 19#1; and corresponding to network demands, the LDs can be increased in the LD bank 19#1.

Further, even if the amplification capacity of the amplifiers 14#11-14#18 is for optical signals of up to a number of wavelengths other than 23, by optimally changing the number of LDs in the LD bank 19#1 according to the amplification capacity, device cost can be suppressed.

Figure 8:
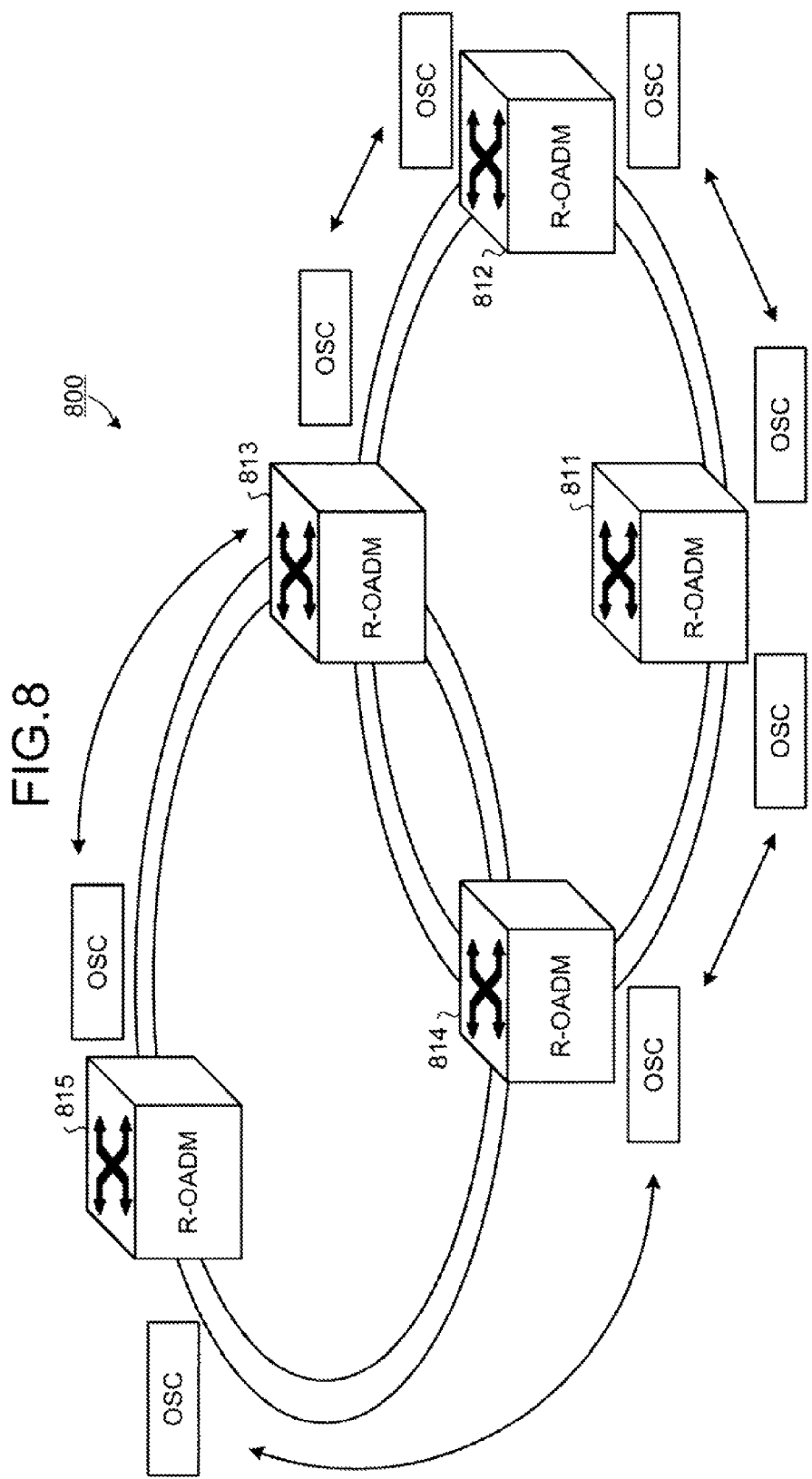
FIG. 8 is a diagram of an example of a communications system applying the optical add-drop device.

FIG. 8 is a diagram of an example of a communications system applying the optical add-drop device. A communications system 800 depicted in FIG. 8 includes R-OADM nodes 811-815. The optical add-drop device 200, for example, can be applied as at least one of the R-OADM nodes 811-815. The R-OADM nodes 811-814 are connected in a ring-state. Further, the R-OADM nodes 813, 814, and 815 are also connected in a ring-state. The R-OADM nodes 811-814 respectively transmit wavelength division multiplexed light to a neighboring node.

The R-OADM nodes 811-814 respectively communicate optical supervisory channels (OSC) for monitoring control. Consequently, the R-OADM nodes 811-814, respectively, can acquire wavelength count information indicating the number of wavelengths of the wavelength division multiplexed light from the degrees, storage location information indicating the storage location (drop destination) of optical signals included in the wavelength division multiplexed light from the degrees, etc.

Although control of the LDs 19#11-19#1p and the optical switch 19#1b by the controller 19#1a of the LD bank 19#1 has been described to be performed according to user operation of the controller 19#1a, configuration is not limited hereto. For example, the controller 19#1a may automatically control the LDs 19#11-19#1p and the optical switch 19#1b.

For example, the controller 19#1a identifies, from among the amplifiers, an amplifier whose amplification capacity is insufficient and controls the LDs 19#11-19#1p and the optical switch 19#1b to supply pump light to the amplifier and similarly for the controllers 19#2a-19#ma of the LD banks 19#2-19#m.

Figure 9:
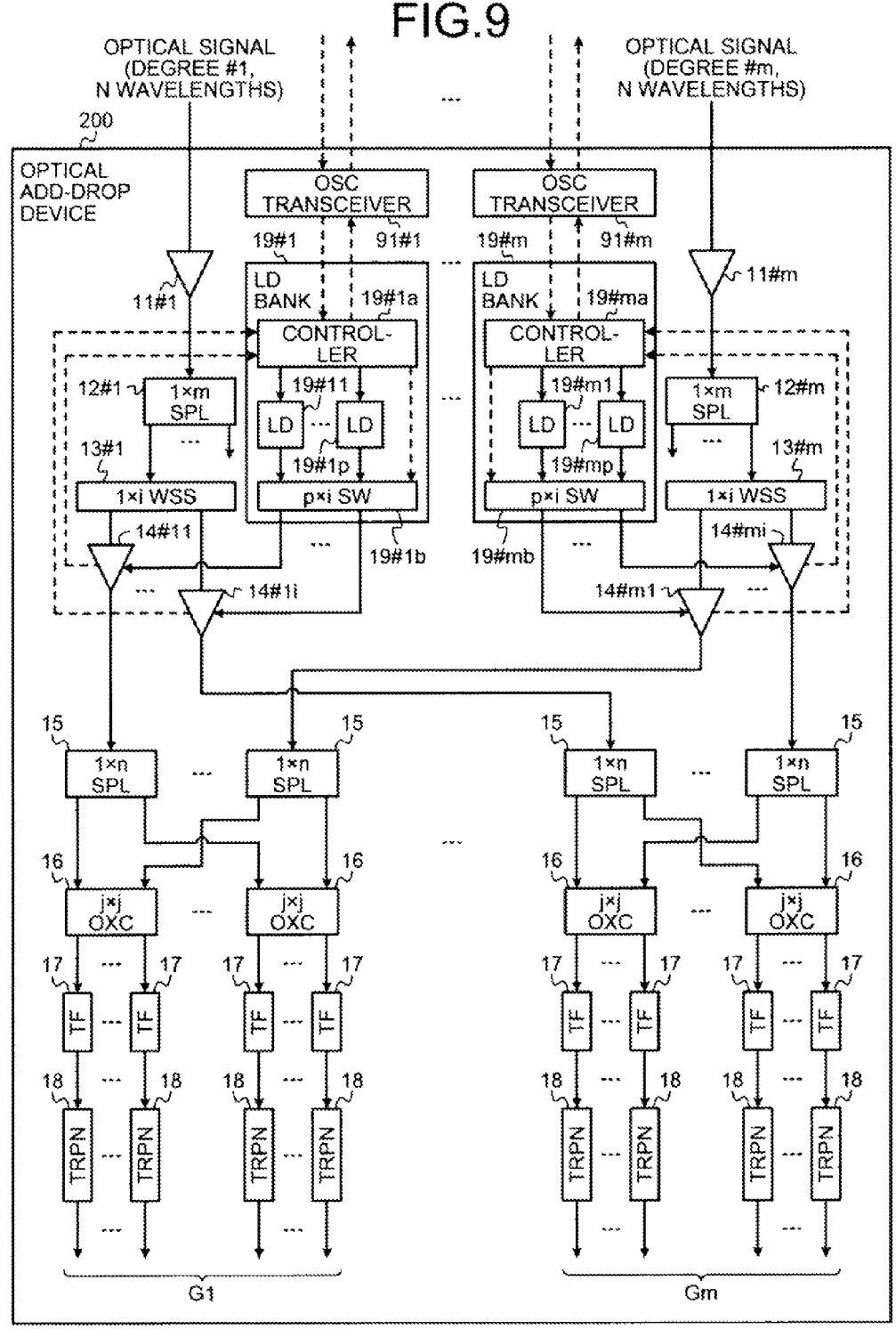
FIG. 9 is a diagram of a first example of modification of the optical add-drop device.

FIG. 9 is a diagram of a first example of modification of the optical add-drop device. In FIG. 9, components identical to those depicted in FIG. 2 are given the same reference numerals used in FIG. 2 and description thereof is omitted. As depicted in FIG. 9, the optical add-drop device 200 further includes m OSC transceivers 91#1-91#m, in addition to the configuration depicted in FIG. 2. The OSC transceivers 91#1-91#m communicate between networks, OSCs related to each of the degrees #1-#m. For example, the OSC transceiver 91#1 acquires by an OSC, wavelength count information and storage location information related to the optical signal from degree #1.

The wavelength count information is information indicating the number of wavelengths (e.g., 96) included in the optical signal input to the optical add-drop device 200 from degree #1. The storage location information is information that indicates to which group among the groups G1-Gm, the optical signal of each wavelength that is included in the optical signal input to the optical add-drop device 200 from the degree #1 is to be stored (dropped). For example, the storage location information is correspondence information correlating the wavelengths included in the optical signal and the groups G1-Gm.

The OSC transceiver 91#1 outputs the acquired wavelength count information and the storage location information to the LD bank 19#1. Further, the OSC transceiver 91#1 transmits to a network by an OSC, a switch completion signal output from the LD bank 19#1.

The controller 19#1a of the LD bank 19#1, based on the wavelength count information and the storage location information output from the OSC transceiver 91#1, controls the LDs 19#11-19#1p and the optical switch 19#1b. Further, if control of the LDs 19#11-19#1p and the optical switch 19#1b is finished, the controller 19#1a may output to the OSC transceiver 91#1, a switch completion signal indicating that path switching has been completed.

Figure 10:
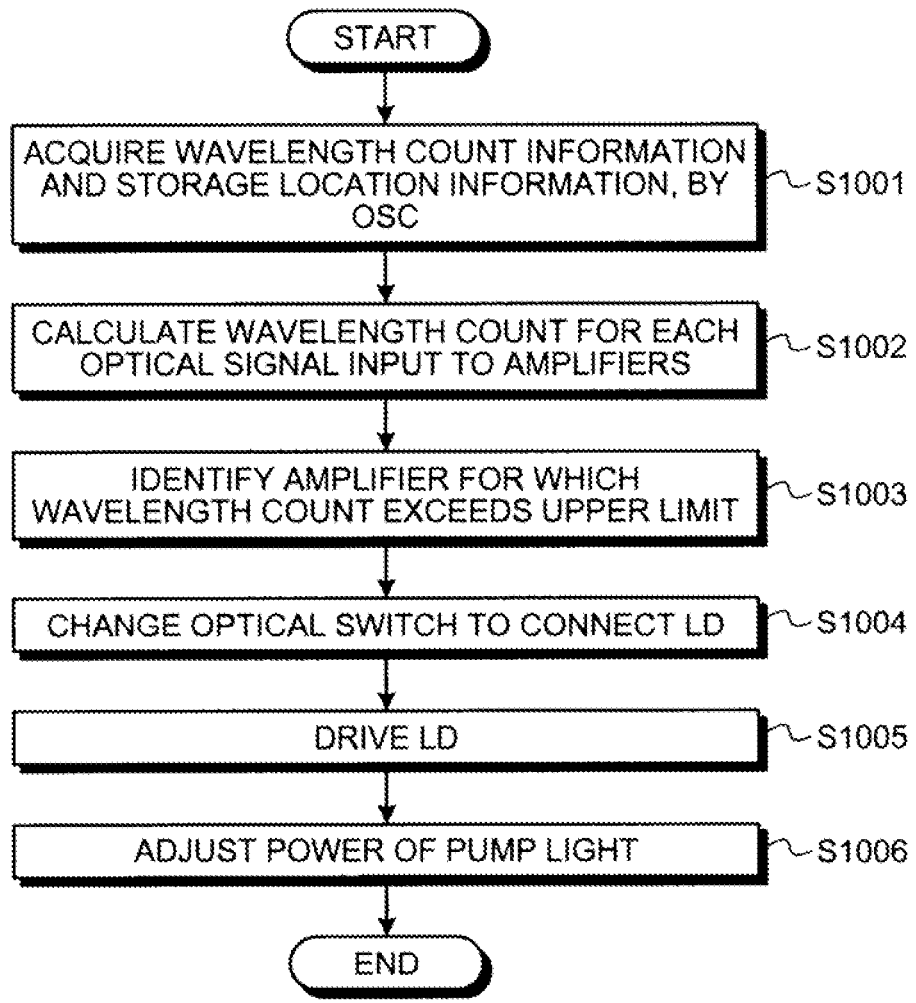
FIG. 10 is a flowchart of a first example of control processing by a controller depicted in FIG. 9.

FIG. 10 is a flowchart of a first example of control processing by the controller depicted in FIG. 9. Here, although an example will be described concerning control processing by the controller 19#1a of the LD bank 19#1, the control processing by the controllers 19#2a-19#ma of the LD banks 19#2-19#m is identical (similarly, for FIGS. 11 and 12).

Upon startup, for example, the controller 19#1a of the LD bank 19#1 performs the control processing depicted in FIG. 10. The controller 19#1a, via the OSC transceiver 91#1, acquires by an OSC and from a network, the wavelength count information and the storage location information related to the optical signal input to the optical add-drop device 200 from the degree #1 (step S1001).

The controller 19#1a, based on the wavelength count information and the storage location information acquired at step S1001, calculates the number of wavelengths of the optical signals respectively input to the amplifiers 14#11-14#1i (step S1002). The optical signals amplified by the amplifiers 14#11-14#1i are stored to the groups G1-Gm, respectively. Therefore, the number of wavelengths of the optical signals input to the amplifiers 14#11-14#1i can be calculated by calculating the number of wavelengths stored in the groups G1-Gm, based on the storage location information.

Among the amplifiers 14#11-14#1i, the controller 19#1a identifies an amplifier receiving input of an optical signal whose number of wavelengths calculated at step S1002 exceeds the upper limit (e.g., 23 wavelengths) (step S1003). In other words, the controller 19#1a identifies an amplifier whose capacity is insufficient, among the amplifiers 14#11-14#1i. Next, the controller 19#1a changes the optical switch 19#1b to connect the amplifier identified at step S1003 to an LD among the LDs 19#11-19#14 (step S1004).

The controller 19#1a drives the LD that is connected to the amplifier at step S1004 (step S1005). The controller 19#1a controls the drive current and thereby adjusts the power of the pump light of the LD driven at step S1005 (step S1006), ending a series of processes.

In this manner, the controller 19#1a acquires wavelength counts for each optical signal input to the amplifiers 14#11-14#1i and based on the acquired wavelength counts for each optical signal, identifies amplifiers whose capacity is insufficient. The controller 19#1a controls LDs 19#11-19#1p and the optical switch 19#1b such that pump light is supplied to the identified amplifier.

Figure 11:
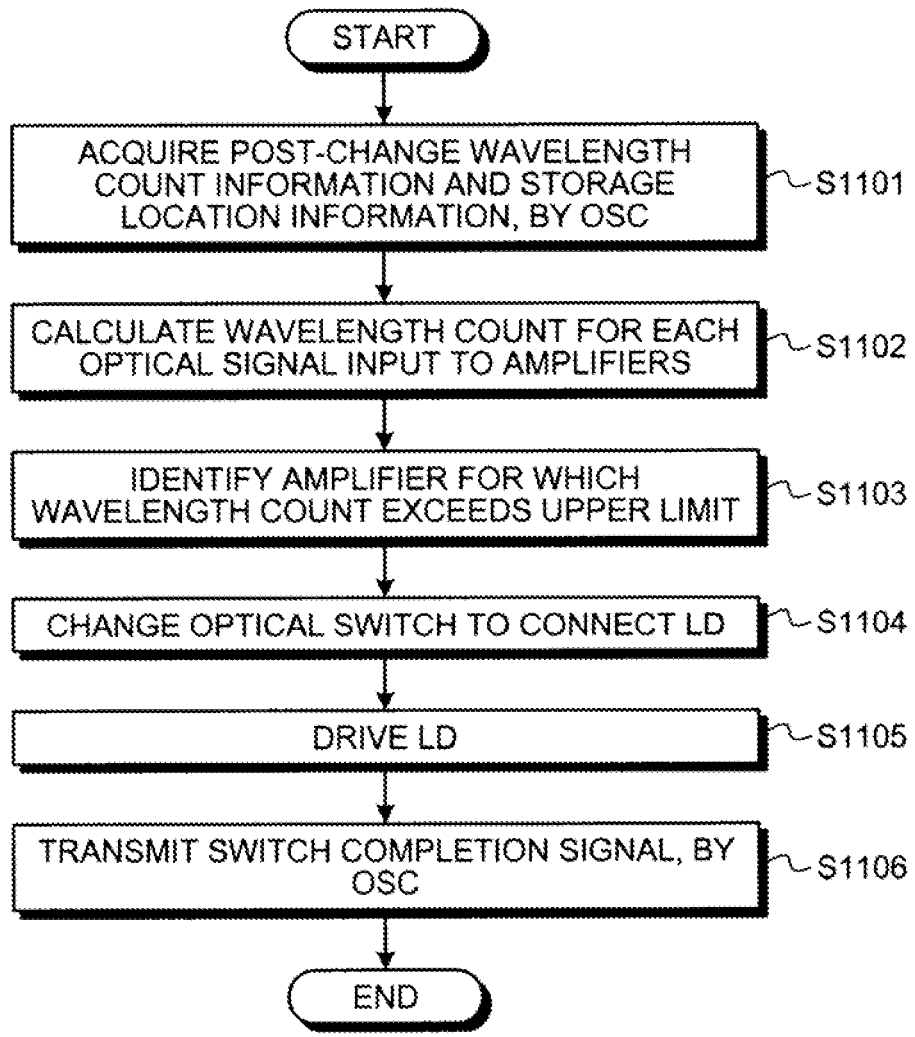
FIG. 11 is a flowchart of a second example of control processing by the controller depicted in FIG. 9.

FIG. 11 is a flowchart of a second example of control processing by the controller depicted in FIG. 9. The controller 19#1a of the LD bank 19#1 performs the control processing depicted in FIG. 11, for example, if the amplifying capacity of an amplifier becomes insufficient during operation of the optical add-drop device 200. The controller 19#1a, via the OSC transceiver 91#1, acquires by an OSC and from a network, post-change wavelength count information and storage location information related to the optical signal input to the optical add-drop device 200 from degree #1 (step S1101).

The post-change wavelength count information and storage location information is change information that, for example, is preliminarily transmitted from the network if wavelength re-arrangement on the network has occurred, and the wavelength count and/or the storage location has changed. The post-change wavelength count information and storage location information is information indicating the number of wavelengths of the optical signal input to the optical add-drop device 200 from the degree #1 and the storage locations of each wavelength after such a change.

Steps S1102-S1105 depicted in FIG. 11 are identical to steps S1002-S1005 depicted in FIG. 10. After step S1105, the controller 19#1a transmits a switch completion signal to the network by an OSC (step S1106), ending a series of processes. By the processing depicted in FIG. 11, for example, if wavelength re-arrangement occurs on the network, the controller 19#1a acquires before the change of the wavelengths of the optical signals, change information indicating changes of the wavelengths of the optical signals input to the amplifiers 14#11-14#1i.

The controller 19#1a, based on the acquired change information, preliminarily identifies among the amplifiers 14#11-14#1i, an amplifier for which the power of the pump light is insufficient. Further, the controller 19#1a preliminarily connects the identified amplifier to any one of the LDs 19#11-19#14 of the LD bank 19#1 and drives the connected LD. Consequently, the recovery time after the switching is reduced, enabling a more flexible configuration that suppresses power consumption.

Figure 12:
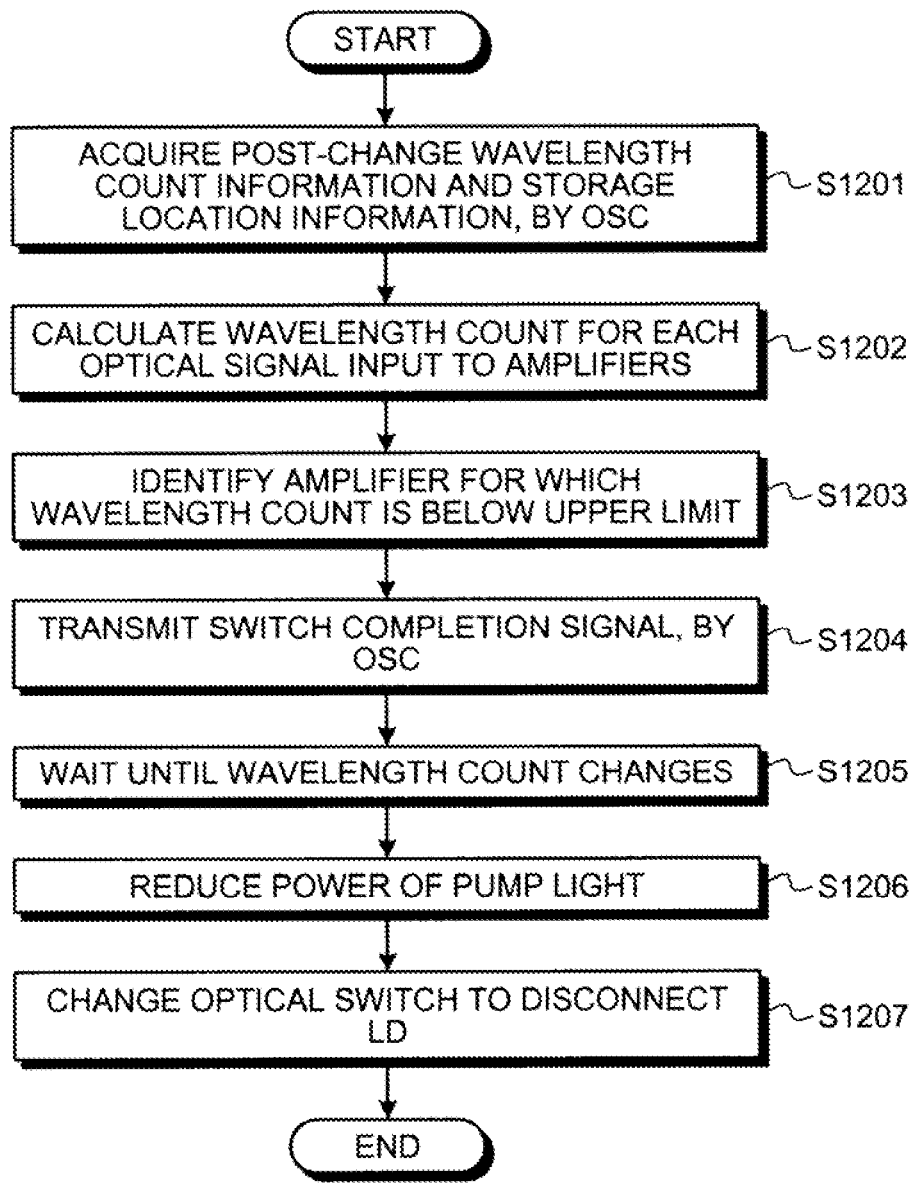
FIG. 12 is a flowchart of a third example of control processing by the controller depicted in FIG. 9.

FIG. 12 is a flowchart of a third example of control processing by the controller depicted in FIG. 9. The controller 19#1a performs the control processing depicted in FIG. 12, for example, if during operation, the supply of the pump light by the LD bank 19#1 to the amplifier becomes unnecessary. Steps S1201 and S1202 depicted in FIG. 12 are identical to steps S1101 and S1102 depicted in FIG. 11.

After step S1202, the controller 19#1a identifies among the amplifiers being supplied pump light from the LD bank 19#1, an amplifier for which the number of wavelengths calculated at step S1202 has dropped below the upper limit (e.g., 23 wavelengths) (step S1203). In other words, the controller 19#1a identifies among the amplifiers 14#11-14#1i, an amplifier to which the supply of pump light has become unnecessary. Next, the controller 19#1a, via the OSC transceiver 91#1, transmits a switch completion signal by an OSC, to the network (step S1204).

Next, the controller 19#1a waits until the number of wavelengths of the optical signals input to the amplifiers 14#11-14#1i changes consequent to wavelength re-arrangement, etc. (step S1205). The controller 19#1a reduces the power of the pump light supplied to the amplifier identified at step S1203 (step S1206). On the contrary, for an amplifier identified at step S1203, the power of the pump light of the internal LD is increased maintaining a balance such that the output level of the amplifier does not change.

If the power of the pump light supplied to the amplifier identified at step S1203 becomes zero at step S1206, the controller 19#1a changes the optical switch 19#1b and disconnects from the amplifier, the LD whose pump light power has become zero (step S1207), ending a series of processes. In this manner, the controller 19#1a may control the LD and the optical switch 19#1b after waiting for a re-arrangement of the wavelengths, if the supply of pump light to the amplifier by the LD bank 19#1 becomes unnecessary.

Figure 13:
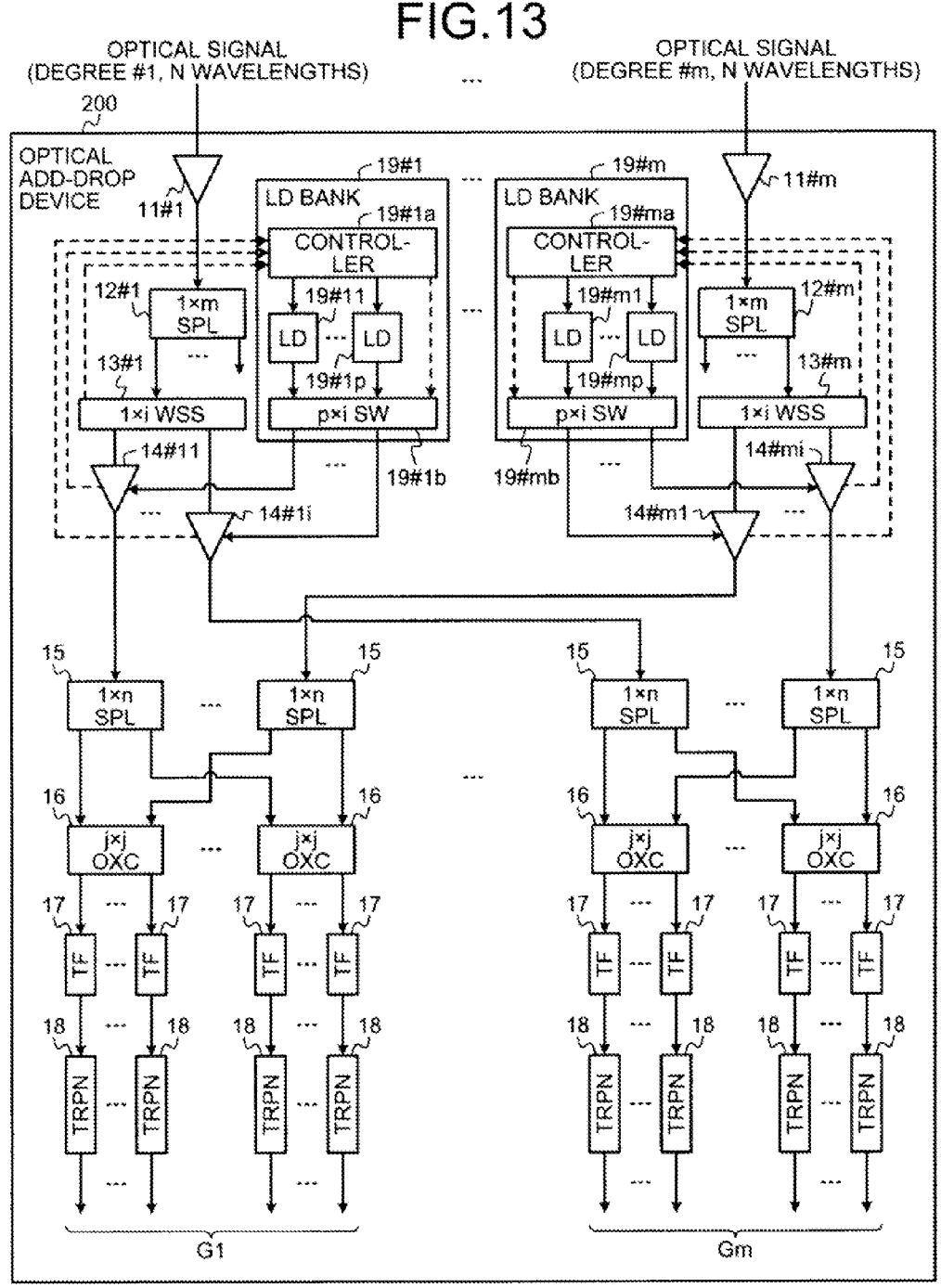
FIG. 13 is a diagram of a second example of modification of the optical add-drop device.

FIG. 13 is a diagram of a second example of modification of the optical add-drop device. In FIG. 13, components identical to those depicted in FIG. 2 are given the same reference numerals and description thereof is omitted. As depicted in FIG. 13, the wavelength selective switches 13#1-13#m of the optical add-drop device 200 respectively output to the LD banks 19#1-19#m, wavelength count information indicating the number of wavelengths of the optical signals assigned to and output to the amplifiers 14#11-14#1i, . . . , 14#m1-14#mi. For example, the wavelength selective switch 13#1 of the optical add-drop device 200 outputs to the LD bank 19#1, wavelength count information indicating the number of wavelengths of the optical signals output to the amplifiers 14#11-14#1i.

The controllers 19#1a-19#ma of the LD banks 19#1-19#m respectively perform control that is based on the wavelength count information output from the wavelength selective switches 13#1-13#m. For example, the controller 19#1a controls the LDs 19#11-19#1p and the optical switch 19#1b, based on the wavelength count information output from the wavelength selective switch 13#1.

Figure 14:
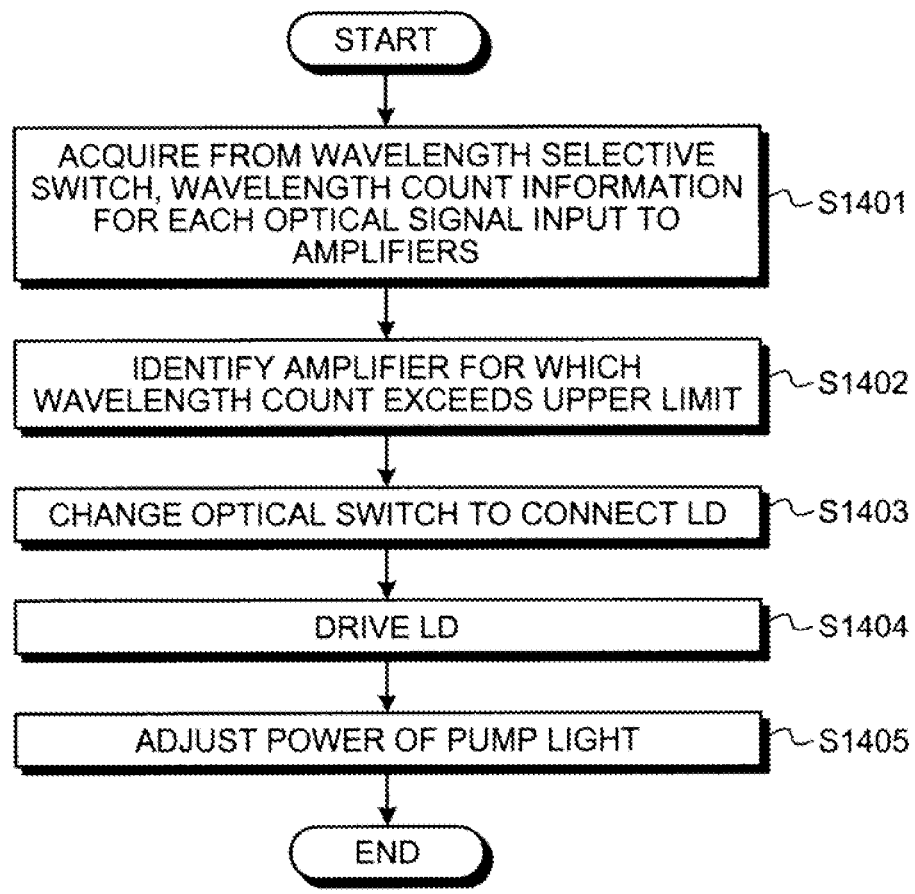
FIG. 14 is a flowchart of an example of control processing by the controller depicted in FIG. 13.

FIG. 14 is a flowchart of an example of control processing by the controller depicted in FIG. 13. Here, description is given concerning the control processing by the controller 19#1a of the LD bank 19#1, however, the control processing by the controllers 19#2a-19#ma of the LD banks 19#2-19#m is identical. The controller 19#1a of the LD bank 19#1 depicted in FIG. 13, for example, performs the control processing depicted in FIG. 14.

The controller 19#1a acquires from the wavelength selective switch 13#1, wavelength count information indicating the number of wavelengths in the optical signals input to the amplifiers 14#11-14#1i (each amplifier) (step S1401). Next, the controller 19#1a, based on the wavelength count information acquired at step S1401, identifies among the amplifiers 14#11-14#1i, an amplifier receiving input of an optical signal whose number of wavelengths exceeds the upper limit (e.g., 23 wavelengths) (step S1402).

Steps S1403-S1405 depicted in FIG. 14 are identical to steps S1004-S1006 depicted in FIG. 10. In this manner, the controller 19#1a acquires a wavelength count for each of the optical signals distributed to optical paths by the wavelength selective switch 13#1 and based on the acquired optical signal wavelength counts, identifies an amplifier whose amplification capacity is insufficient among the amplifiers 14#11-14#1i.

Figure 15:
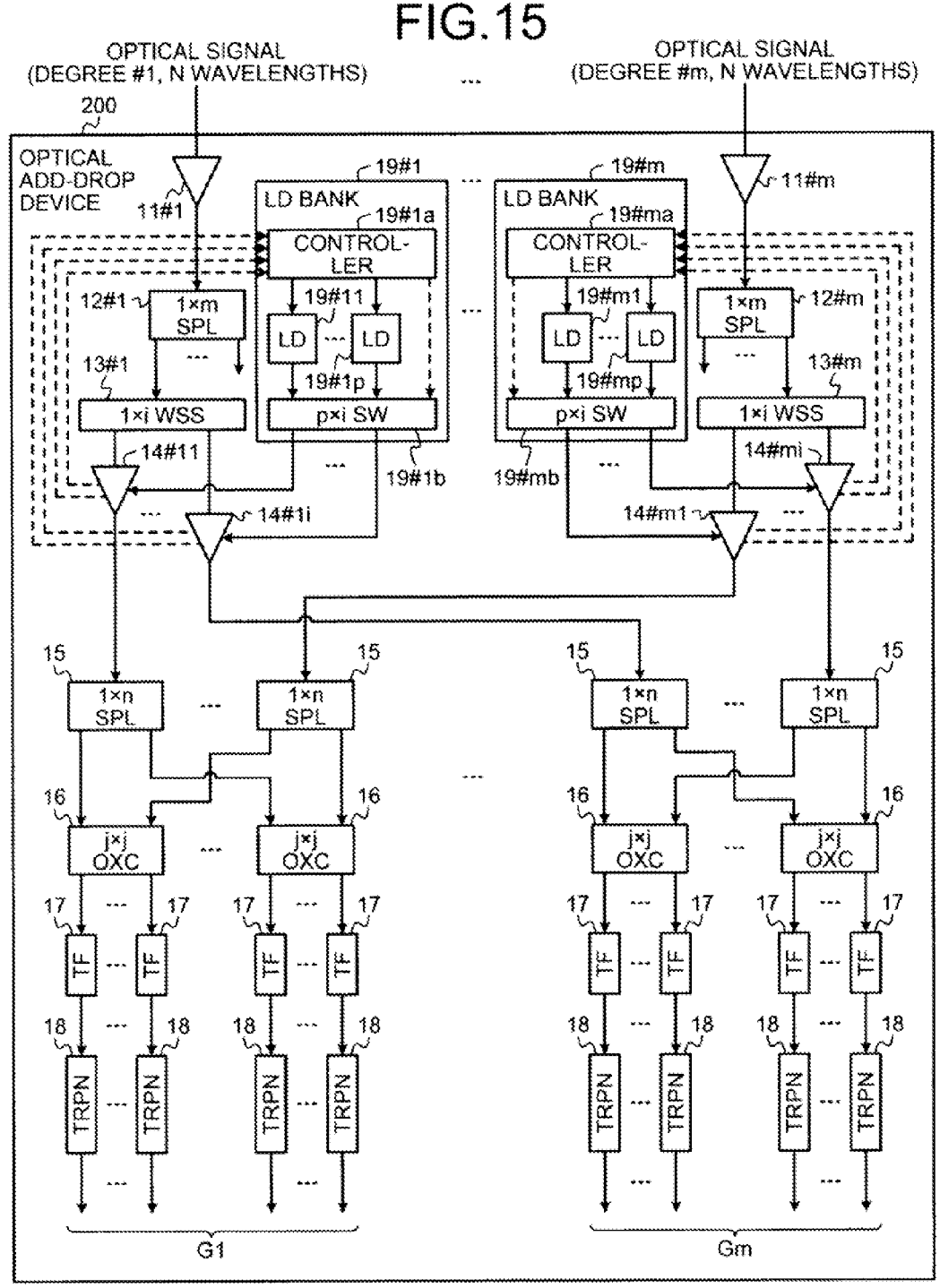
FIG. 15 is a diagram of a third example of modification of the optical add-drop device.

FIG. 15 is a diagram of a third example of modification of the optical add-drop device. In FIG. 15, components identical to those depicted in FIG. 2 are given the same reference numerals used in FIG. 2 and description thereof is omitted. As depicted in FIG. 15, the amplifiers 14#11-14#1i, . . . , 14#m1-14#mi of the optical add-drop device 200 respectively output to the LD banks 19#1-19#m, output power information or pump power information indicating the APC state of the amplifier. For example, any one of the amplifiers 14#11-14#1i outputs to the LD bank 19#1, output power information or pump power information.

The output power information, for example, is information indicating the power of the optical signals output by the amplifiers 14#11-14#1i, . . . , 14#m1-14#mi. Each of the AGC controllers 338 of the amplifiers 14#11-14#1i, . . . , 14#m1-14#mi (see, FIG. 3) output as output power information to the LD banks 19#1-19#m, information respectively acquired by APC and indicating the output power (e.g., output of the PD 337 depicted in FIG. 3).

The pump power information, for example, is information indicating the power of internal pump light generated by the internal LDs (e.g., the LD 335 depicted in FIG. 3) of the amplifiers 14#11-14#1i, . . . , 14#m1-14#mi. Each of the AGC controllers 338 of the amplifiers 14#11-14#1i, . . . , 14#m1-14#mi (see FIG. 3) output as pump power information to the LD banks 19#1-19#m, information indicating the value of the drive current input to the internal LD of each amplifier.

The controllers 19#1a-19#ma of the LD banks 19#1-19#m perform control that is based in the output power information or the pump power information output from the amplifiers 14#11-14#1i, . . . , 14#m1-14#mi, respectively. For example, based on the output power information or the pump power information output from the amplifiers 14#11-14#1i, the controller 19#1a controls the LDs 19#11-19#1p and the optical switch 19#1b. For example, the controller 19#1a controls the LDs 19#11-19#1p and the optical switch 19#1b such that pump light is supplied to, among the amplifiers 14#11-14#1i, an amplifier for which the output power or pump power exceeds a threshold.

Figure 16:
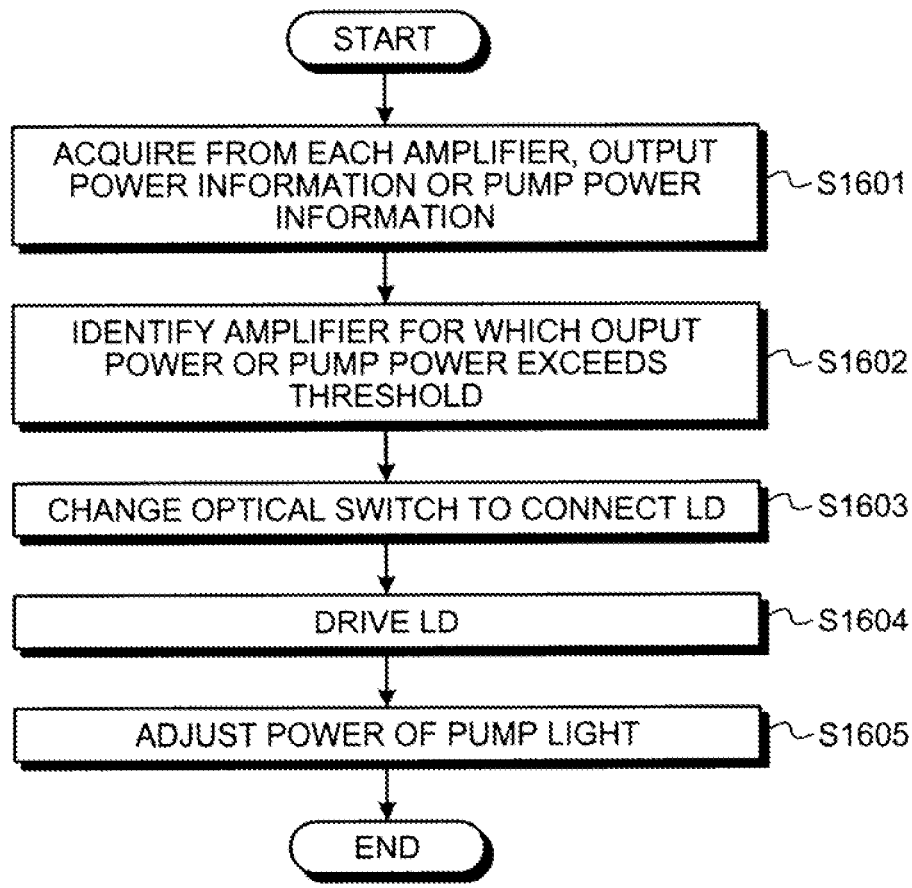
FIG. 16 is a flowchart of an example of the control processing by the controller depicted in FIG. 15.

FIG. 16 is a flowchart of an example of the control processing by the controller depicted in FIG. 15. Here, description will be given concerning the control processing by the controller 19#1a of the LD bank 19#1, however, the control processing by the controllers 19#2a -19#ma of the LD banks 19#2-19#m is identical. The controller 19#1a of the LD bank 19#1 depicted in FIG. 15, for example, performs the control processing depicted in FIG. 16.

The controller 19#1a acquires from each of the amplifiers 14#11-14#1i, output power information or pump power information (step S1601) and based on the acquired output power information or pump power information, identifies an amplifier for which the output power or pump power exceeds a threshold (step S1602). Steps S1603-S1605 depicted in FIG. 16 are identical to steps S1403-S1405 depicted in FIG. 14.

In this manner, the controller 19#1a acquires pump power information for the amplifiers 14#11-14#1i and based on the acquired pump power information, identifies an amplifier whose amplification capacity is insufficient. Alternatively, the controller 19#1a acquires output power information that indicates the power of the optical signals output by the amplifiers 14#11-14#1i and based on the acquired output power information, identifies an amplifier whose amplification capacity is insufficient.

Figure 17:
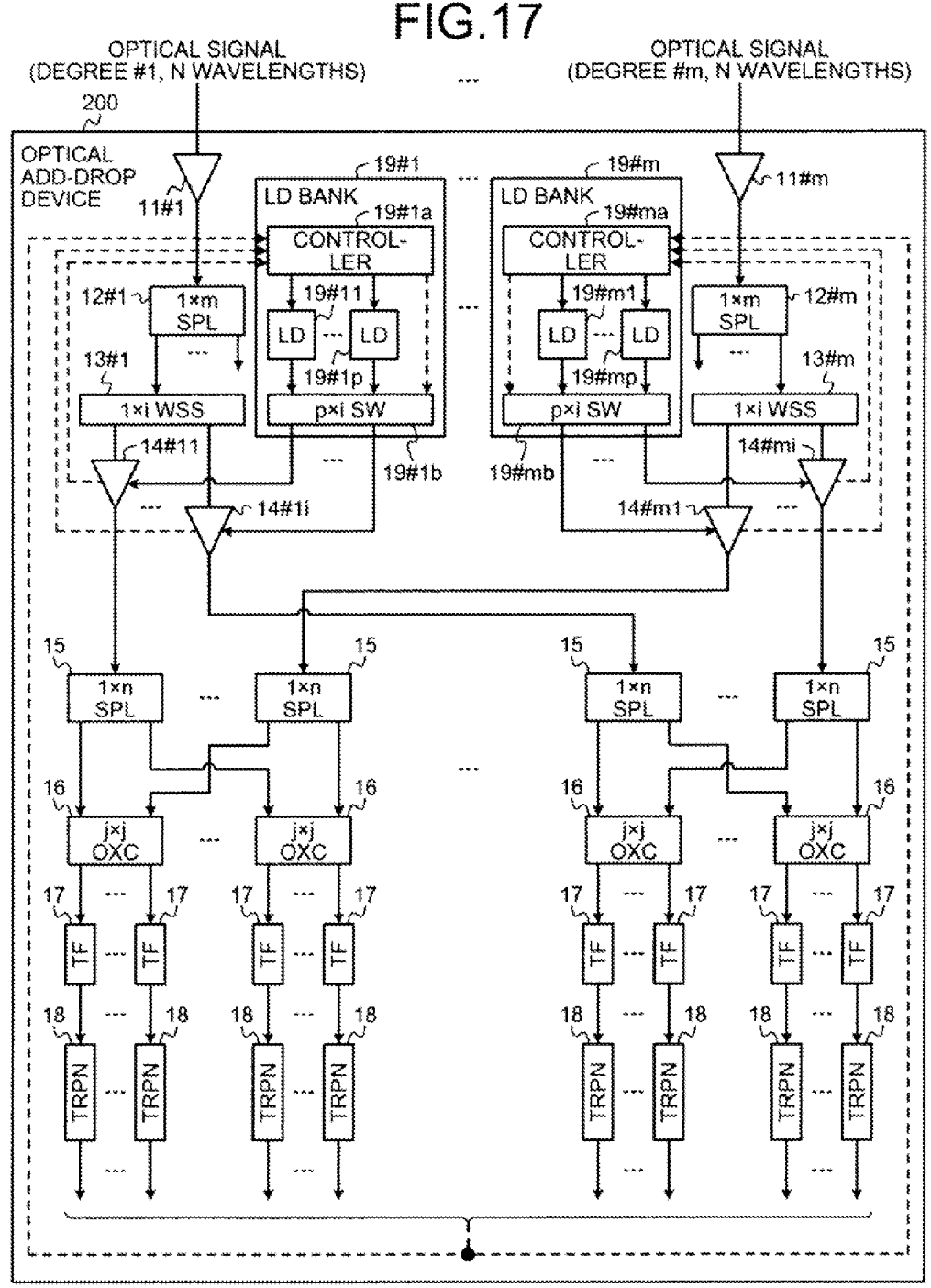
FIG. 17 is a diagram of a fourth example of modification of the optical add-drop device.

FIG. 17 is a diagram of a fourth example of modification of the optical add-drop device. In FIG. 17, components identical to those depicted in FIG. 2 are given the same reference numerals used in FIG. 2 and description thereof is omitted. As depicted in FIG. 17, each of the k×j transponders 18 of the optical add-drop device 200 output to the LD banks 19#1-19#m, reception power information indicating the power of optical signal received by the LD bank. The controllers 19#1a-19#ma of the LD banks 19#1-19#m respectively perform control that is based on the reception power information output from the k×j transponders 18.

Figure 18:
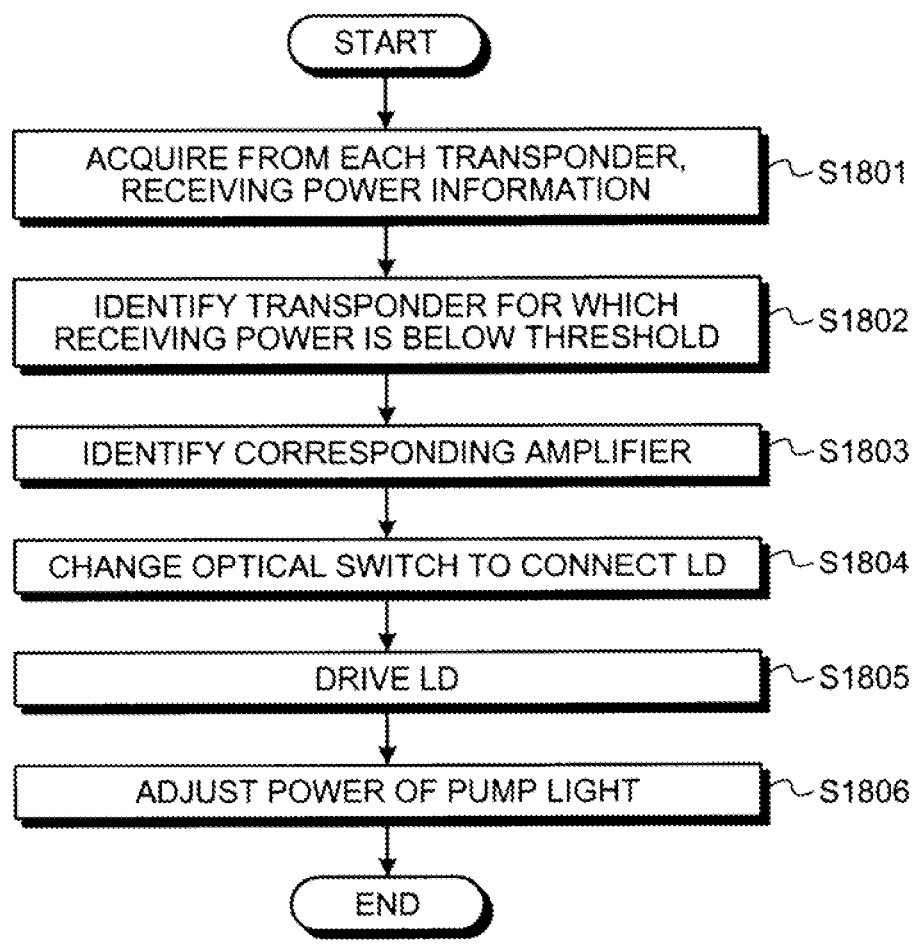
FIG. 18 is a flowchart of an example of the control processing by the controller depicted in FIG. 17.

FIG. 18 is a flowchart of an example of the control processing by the controller depicted in FIG. 17. Here, description is given concerning the controller 19#1a of the LD bank 19#1, however, the control processing by the controllers 19#2a-19#ma of the LD banks 19#2-19#m is identical. The controller 19#1a of the LD bank 19#1 depicted in FIG. 17, for example, performs the control processing depicted in FIG. 18, during operation of the optical add-drop device 200.

The controller 19#1a acquires from each of the k×j transponders 18, reception power information thereof (step S1801). Next, based on the acquired reception power information, the controller 19#1a identifies among the k×j transponders 18, a transponder for which the reception power is below a threshold (step S1802).

The controller 19#1a identifies an amplifier that corresponds to the transponder identified at step S1802 (step S1803). The amplifier that corresponds to the transponder is an amplifier is amplifying the optical signal output to the transponder. For example, the transponders 18 respectively belong to a group among the groups G1-Gm and the groups G1-Gm respectively correspond to the amplifiers 14#11-

14#1i. Therefore, the controller 19#1a identifies the amplifier that corresponds to the group to which the identified transponder belongs.

Steps S1804-S1806 depicted in FIG. 18 are identical to steps S1403-S1405 depicted in FIG. 14. In this manner, the controller 19#1a identifies among the k×j transponders 18 (multiple receivers), a receiver for which optical-signal reception power is below a threshold. The controller 19#1a identifies among the amplifiers 14#11-14#1i, an amplifier that corresponds to the identified receiver.

Although in FIGS. 15 and 16, an example where the LD banks 19#1-19#m identify an amplifier whose amplification capacity is insufficient, based on the pump power information or the output power information for the amplifiers 14#11-14#1i, the amplifiers may respectively determine whether amplification capacity is insufficient. If an amplifier 14#11-14#1i determines that amplification capacity is insufficient, the amplifier transmits a request signal for pump light to the LD banks 19#1-19#m, respectively. The LD banks 19#1-19#m supply pump light to the amplifier that has transmitted the request signal.

Figure 19:
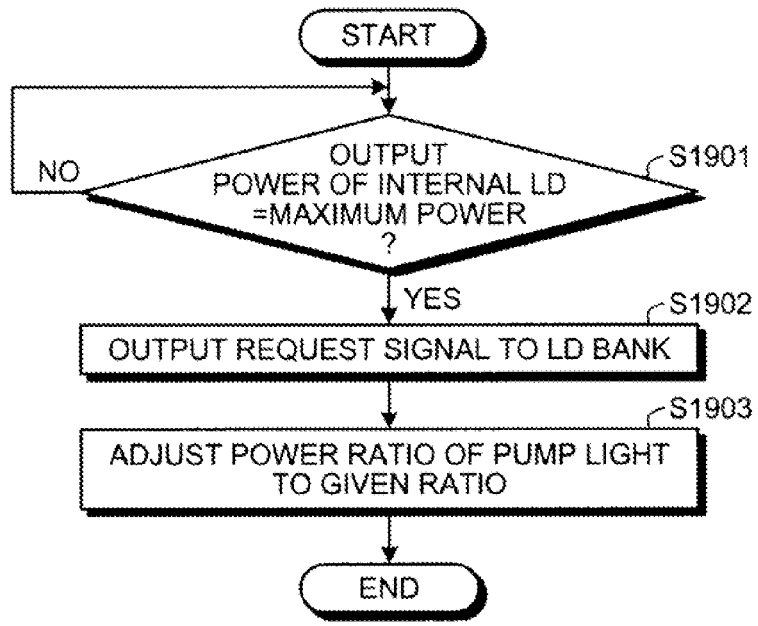
FIG. 19 is a flowchart of an example of control processing by the amplifier.

FIG. 19 is a flowchart of an example of control processing by the amplifier. Here, an example will be described concerning control processing by the amplifier 14#11, however, the control processing by the amplifiers 14#12-14#1i is identical. The AGC controller 338 of the amplifier 14#11 (see, FIG. 3), for example, performs the control depicted in FIG. 19. The AGC controller 338 determines whether the output power of the internal LD (e.g., the LD 335 depicted in FIG. 3) is the maximum power (step S1901), and remains in standby until the output power reaches the maximum power (step S1901: NO).

When the output power reaches the maximum power (step S1901: YES), the AGC controller 338 transmits a request signal to the LD bank 19#1 (step S1902). Consequently, pump light from the LD bank 19#1 is supplied to the amplifier 14#11 and the amplifier 14#11 is able to sufficiently amplify the optical signal.

Further, after step S1902, the AGC controller 338 may perform processing to adjust the power ratio of the pump light from the internal LD and the pump light from the LD bank 19#1 to a given ratio (step S1903). The given ratio, for example, may be preliminarily determined experimentally such that the wavelength components of the optical signal output by the amplifier 14#11 are smooth. In this case, the given ratio is further set in the AGC controller 338. Consequently, the wavelength components of the optical signal output from the amplifier 14#11 become smooth, enabling improved signal quality. In this case, the AGC controller 338 performs APC by performing control to maintain the given ratio between the power of pump light from the internal LD and the power of the pump light from the LD bank 19#1.

After step S1902, the AGC controller 338 may perform APC by fixing (e.g., at the maximum power) the power of the pump light from the internal LD and by controlling the power of the pump light from the LD bank 19#1.

Here, an example has been described in which a request signal is transmitted to the LD bank 19#1 if the output power of the internal LD of the amplifier 14#11 becomes the maximum power, however, the processing is not limited hereto. For example, if the electrical signal (the output power information above) output from the PD 337 or value of the drive current (the pump power information above) output to the LD 335 exceeds a threshold, the AGC controller 338 may transmit a request signal to the LD bank 19#1.

Figure 20:
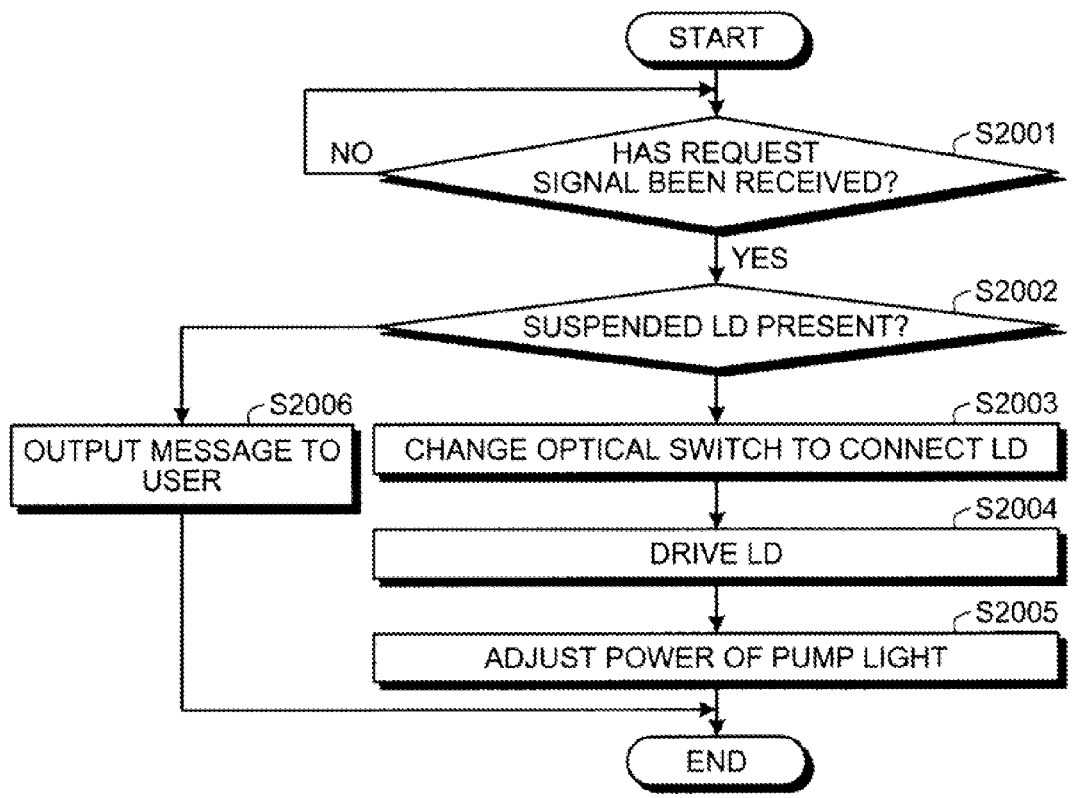
FIG. 20 is a flowchart of an example of control processing by an LD bank, corresponding to FIG. 19.

FIG. 20 is a flowchart of an example of control processing by the LD bank, corresponding to FIG. 19. Here, an example concerning control processing by the LD bank 19#1 will be described, however, the control processing by the LD banks 19#2-19#m is identical. The controller 19#1a of the LD bank 19#2, for example, performs the control processing depicted in FIG. 20.

The controller 19#1a determines whether a request signal has been received from an amplifier among the amplifiers 14#11-14#1i (step S2001), and remains in standby until a request is received (step S2001: NO). Upon receipt of a request signal (step S2001: YES), the controller 19#1a determines whether a suspended LD that is not in operation is among the LDs 19#11-19#1p (step S2002).

At step S2002, if there is a suspended LD among the LDs 19#11-19#1p (step S2002: YES), the controller 19#1a changes the optical switch 19#1b to connect the LD to the amplifier that has transmitted the request signal (step S2003). Steps S2004 and S2005 depicted in FIG. 20 are identical to steps S1405 and S1406 depicted in FIG. 14.

At step S2002, if all LDs 19#11-19#1p are in operation (step S2002: NO), the controller 19#1a outputs a message to the user (step S2006), ending a series of the processes. The message output at step S2004, for example, is a message indicating that the optical signal could not be sufficiently amplified, a message indicating that additional LDs are needed in the LD bank 19#2-19#m, etc.

FIG. 21 is a diagram of a second example of the optical add-drop device. In FIG. 21, components identical to those depicted in FIG. 2 are given the same reference numerals used in FIG. 2 and description thereof is omitted. As depicted in FIG. 21, the optical add-drop device 200 may include an LD bank 19 in place of the banks 19#1-19#m depicted in FIG. 2. The LD bank 19 has the functions of the LD banks 19#1-19#m depicted in FIG. 2 and can handle all of the degrees #1-#m.

The LD bank 19 includes the controller 19a, the LDs 19#1-19#p, and the optical switch 19b. The controller 19a drives the LDs 19#1-19#p by outputting a drive current to the LDs 19#1-19#p and controls the power of the pump light output from the LDs 19#1-19#p, by changing the drive current, based on the control signal output from the amplifiers 14#11-14#1i, . . . , 14#m1-14#mi.

The controller 19a controls the optical switch 19b and controls the destination to which the pump light is supplied from the LDs 19#1-19#p. The control of the LDs 19#1-19#p and the optical switch 19b by the controller 19a, for example, is performed according to user operation of the controller 19a. Further, the controller 19a may automatically control the LDs 19#1-19#p and the optical switch 19#1b.

The p LDs 19#1-19#p respectively generate pump light according to the drive current output from the controller 19a and output the generated pump light to the optical switch 19b. "p", for example, is a number that is less than the number (m×m) of amplifiers 14#11-14#1i, . . . , 14#m1-14#mi. The optical switch 19b (p×mi SW) is an optical cross-connect that supplies the pump light output from the LDs 19#1-19#p to an amplifier among the amplifiers 14#11-14#1i, . . . , 14#m1-14#mi.

Consequently, among the amplifiers 14#11-14#1i, . . . , 14#m1-14#mi, pump light from the LD bank 19 can be supplied to an amplifier whose pump light is insufficient. Further, the examples and modification examples of the optical add-drop device 200 depicted in FIGS. 3 to 20 can be applied to the optical add-drop device 200 depicted in FIG. 21.

FIG. 22 is a diagram of a third example of the optical add-drop device. The optical add-drop device 200 depicted in FIG. 22 is an example of the optical switching device 100 depicted in FIG. 1. However, FIG. 22 depicts a configuration of optical signal adding in the optical add-drop device 200. In FIG. 22, dotted lines represent control signals. The optical add-drop device 200 is assumed to output optical signals (wavelength division multiplexed light) to m degrees (e.g., 8 degrees). Further, the optical signals output by the optical add-drop device 200 to the degrees are assumed to be wavelength division multiplexed optical signals having a maximum of N wavelengths (e.g., 96 wavelengths).

The optical add-drop device 200 includes an adding unit that has CDC function. For example, the optical add-drop device 200 includes k×j transponders 21, k×j tunable filters 22, k cross connects 23, m×i couplers (CPL) 24, m×i amplifiers 25#11-25#mi, m wavelength selective switches 26#1-26#m, m couplers 27#1-27#m, m amplifiers 28#1-28#m, and m LD banks 29#1-29#m.

The amplifiers 25#11-25#mi correspond to the amplifiers 111 depicted in FIG. 1. The tunable filters 22, the cross connects 23, the couplers 24, the wavelength selective switches 26#1-26#m and the couplers 27#1-27#m correspond to the switching unit 110 (adding unit) depicted in FIG. 1. The LD bank 29#1-29#m corresponds to the optical source 112 and the optical switch 113 depicted in FIG. 1.

The k×j transponders 21 (transmitter) output optical signals to the k×j tunable filters 22. The k×j tunable filters 22 respectively extract a given wavelength of the optical signals output from the k×j transponders 21. The given wavelength extracted by the k×j tunable filters 22 can be changed by setting. The k×j tunable filters 22 respectively output the extracted optical signals to the k cross connects 23.

The k cross connects 23 are j×j cross connects that respectively switch the paths of the optical signals output from the k×j tunable filters 22. The k cross connects 23 output to the m×i couples 24, the optical signals whose paths have been switched.

The m×i couplers 24 respectively are n×1 couplers that couple the n optical signals output from the k cross connects 23. The m×i couplers 24 output the coupled optical signals to the amplifiers 25#11-25#1i, . . . , 25#m1-25#mi, respectively.

The m×i amplifiers 25#11-25#1i, . . . , 25#m1-25#mi amplify the optical signals output from the m×i couplers 24. The amplifiers 25#11-25#1i, . . . , 25#m1-25#mi output the amplified optical signals to the wavelength selective switches 26#1-26#m, respectively.

The m wavelength selective switches 26#1-26#m respectively are i×1 wavelength selective switches that select and couple optical signals of a given wavelength included in the m optical signals respectively output from the amplifier 25#11-25#1i, . . . , 25#m1-25#mi. The wavelength selective switches 26#1-26#m output the coupled optical signals to the couplers 27#1-27#m, respectively.

The m couplers 27#1-27#m respectively are m×1 coupler that couple the optical signals output from wavelength selective switches 26#1-26#m with optical signals from other degrees. The couplers 27#1-27#m output the coupled optical signals to the amplifiers 28#1-28#m, respectively (add). The m amplifiers 28#1-28#m amplify the optical signals respectively output from the couplers 27#1-27#m. The amplifiers 28#1-28#m output the amplified optical signals to the degrees #1-#m, respectively.

The m LD banks 29#1-29#m are provided to respectively correspond to the degrees #1-#m. The LD banks 29#1-29#m respectively include a controller 29#1a-29#ma, a set of LDs 29#11-29#1p, . . . , 29#m1-29#mp, and an optical switch 29#1b-29#mb. The LD banks 29#1-29#m have a configuration identical that of the LD banks 19#1-19#m depicted in the FIG. 2.

Thus, pump light from the LD bank 29#1 can be supplied to an amplifier whose pump light power is insufficient among the amplifiers 25#11-25#1i. In the present example, although description has been given with respect to the LD bank 29#1, similarly for the LD banks 29#2-29#m, pump light can be supplied to an amplifier whose pump light power is insufficient among the amplifiers 25#21-25#2i, . . . , 25#m1-25#mi.

The number of degrees, the number of wavelengths included in the wavelength division multiplexed light, the application range of the LD banks, the number of LDs, the number of switch ports, the amplifier positions, etc. depicted in FIG. 22 represent one example. Therefore, various changes to the configuration depicted in FIG. 22 are possible. For example, the amplifiers that receive the pump light from the LD banks 29#1-29#m are not limited to the amplifiers 25#11-25#1i, . . . , 25#m1-25#mi. For example, amplifiers disposed on the paths of the switching units that split the optical signals can be applied.

Further, the number of LD banks 29#1-29#m (in the example depicted in FIG. 22, m) and the number of ports of the optical switches 29#1b-29#mb are optimally determined based on the number of amplifiers to be supplied the pump light, the capacity preliminarily determined to be given the amplifiers to be supplied the pump light, etc.

The examples and modifications of the optical add-drop device 200 depicted in FIGS. 3 to 20 can be applied to the optical add-drop device 200 depicted in FIG. 22. As depicted by the optical add-drop device 200 depicted in FIG. 21, in the optical add-drop device 200 depicted in FIG. 22, an LD bank that has the functions of the LD banks 29#1-29#m and can handle all of the degrees #1-#m may be disposed.

As described, according to the optical switching device and the communications system, amplifiers capable of amplifying optical signals using pump light supplied from an external source and an optical source that generates pump light can be connected. Consequently, pump light can be supplied to an amplifier whose amplification capacity is insufficient due to the add or drop state. Therefore, optical signal amplification can be performed more efficiently.

For example, if CDC configuration is implemented in an OADM, although numerous amplifiers are disposed, the present configuration in which pump light can be supplied to an amplifier whose amplification capacity is insufficient enables reductions in cost. Furthermore, since the number of LDs can be reduced, reductions in device size and power consumption can be facilitated.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical switching device comprising:
a optical add/drop multiplexer that at least adds an optical signal into and/or drops an optical signal from wavelength division multiplexed light that is wavelength division multiplexed optical signals;
a plurality of amplifiers that are disposed on optical paths included in the optical add/drop multiplexer and that can use supplied pump light to amplify the optical signals;

an optical source that generates the pump light;
an optical switch that supplies the generated pump light to any one of the amplifiers; and
a controller that identifies an amplifier whose power of an internal laser diode (LD) is insufficient among the amplifiers and controls the optical source and the optical switch such that the pump light is supplied to the identified amplifier.

2. The optical switching device according to claim 1, wherein
the optical add/drop multiplexer includes a wavelength selective switch that distributes the wavelength division multiplexed light among the optical paths, according to wavelength, and
the amplifiers are disposed on the optical paths respectively.

3. The optical switching device according to claim 1, comprising a plurality of the optical sources, wherein
the optical switch supplies the pump light generated by the optical sources to any one of the amplifiers.

4. The optical switching device according to claim 1, wherein the optical switch is an optical cross connect that connects the optical source and the amplifiers.

5. The optical switching device according to claim 3, wherein the optical sources are of a number less than the number of amplifiers.

6. The optical switching device according to claim 1, wherein the controller acquires a wavelength count for each of the optical signals input to the amplifiers and based on the acquired wavelength counts, identifies the amplifier whose amplification capacity is insufficient.

7. The optical switching device according to claim 1, wherein the controller acquires change information indicating a change in the wavelength count of an optical signal and based on the acquired change information, controls the optical source and the optical switch before the change.

8. The optical switching device according to claim 1, wherein
the optical add/drop multiplexer includes a wavelength selective switch that distributes the optical signals among the optical paths, according to wavelength, and
the controller acquires a wavelength count for each of the optical signals distributed among the optical paths by the wavelength selective switch and based on the acquired wavelength counts, identifies the amplifier whose amplification capacity is insufficient.

9. The optical switching device according to claim 1, wherein
the amplifiers respectively amplify the optical signals, using internal pump light generated by an internal optical source, and
the controller acquires pump power information that indicates the power of the internal pump light of the amplifiers and based on the acquired pump power information, identifies the amplifier whose amplification capacity is insufficient.

10. The optical switching device according to claim 1, wherein the controller acquires output power information that indicates the power of the optical signals output by the amplifiers and based on the acquired output power information, identifies the amplifier whose amplification capacity is insufficient.

11. The optical switching device according to claim 1, comprising a plurality of receivers that receive the optical signals split by the optical add/drop multiplexer, wherein
the controller identifies among the receivers, a receiver for which reception power of the optical signal is below a threshold and identifies among the amplifiers, the amplifier that corresponds to the identified receiver.

12. The optical switching device according to claim 1, wherein
among the amplifiers, if an amplifier has insufficient amplification capacity, the amplifier transmits a request signal, and
the optical switching device further comprises a controller that controls the optical source and the optical switch such that the pump light is supplied to the amplifier that has transmitted the request signal.

13. The optical switching device according to claim 1, wherein the amplifiers respectively amplify the optical signals, using internal pump light generated by an internal optical source and if the pump light is supplied via the optical switch, the amplifiers adjust the ratio of the power of the pump light supplied via the optical switch and the power of the internal pump light to a given ratio.

14. The optical switching device according to claim 1, wherein
the optical add/drop multiplexer includes a wavelength selective switch that selects and couples according to wavelength, the optical signals output from the optical paths, and
the amplifiers are respectively disposed on the optical paths.

15. The optical switching device according to claim 1, wherein the amplifiers respectively include:
an input port to which the pump light is supplied, and
an amplifier medium that transmits the pump light input to the input port and the optical signal.

16. A communications system comprising:
a plurality of connected optical switching devices that respectively include:
a optical add/drop multiplexer that at least adds an optical signal into and/or drops an optical signal from wavelength division multiplexed light that is wavelength division multiplexed optical signals;
a plurality of amplifiers that are disposed on optical paths included in the optical add/drop multiplexer and that can use supplied pump light to amplify the optical signals;
an optical source that generates the pump light;
an optical switch that supplies the generated pump light to any one of the amplifiers; and
a controller that identifies an amplifier whose power of an internal laser diode (LD) is insufficient among the amplifiers and controls the optical source and the optical switch such that the pump light is supplied to the identified amplifier, wherein
the communications system transmits the wavelength division multiplexed light.

* * * * *